(12) United States Patent
Narayan et al.

(10) Patent No.: US 10,833,345 B2
(45) Date of Patent: Nov. 10, 2020

(54) MATERIALS FOR HIGH-PERFORMANCE AQUEOUS ORGANIC REDOX FLOW BATTERIES

(71) Applicant: UNIVERSITY OF SOUTHERN CALIFORNIA, Los Angeles, CA (US)

(72) Inventors: Sri Narayan, Arcadia, CA (US); Surya G. Prakash, Hacienda Heights, CA (US); Robert Aniszfeld, Los Angeles, CA (US); Bo Yang, Los Angeles, CA (US); Lena Hoober-Burkhardt, Los Angeles, CA (US); Sankarganesh Krishnamoorthy, Los Angeles, CA (US); Advaith Murali, Los Angeles, CA (US); Archith Nirmalchandar, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 208 days.

(21) Appl. No.: 15/723,071

(22) Filed: Oct. 2, 2017

(65) Prior Publication Data

US 2018/0097249 A1 Apr. 5, 2018

Related U.S. Application Data

(60) Provisional application No. 62/403,004, filed on Sep. 30, 2016.

(51) Int. Cl.
| | |
|---|---|
| *H01M 8/18* | (2006.01) |
| *H01M 8/20* | (2006.01) |
| *H01M 4/96* | (2006.01) |
| *H01M 8/1018* | (2016.01) |

(52) U.S. Cl.
CPC ............. *H01M 8/188* (2013.01); *H01M 8/20* (2013.01); *H01M 4/96* (2013.01); *H01M 2008/1095* (2013.01); *H01M 2250/10* (2013.01); *H01M 2300/0014* (2013.01); *H01M 2300/0082* (2013.01); *Y02E 60/50* (2013.01)

(58) Field of Classification Search
CPC .......... H01M 8/188; H01M 8/20; H01M 4/96; H01M 2008/1095; H01M 2300/0014; H01M 2300/0082; H01M 2250/10; Y02E 60/528
See application file for complete search history.

(56) References Cited

U.S. PATENT DOCUMENTS 9,614,245 B2 4/2017 Narayan et al.

*Primary Examiner* — Laura Weiner
(74) *Attorney, Agent, or Firm* — Brooks Kushman P.C.

(57) ABSTRACT

Quinones and related compounds for use in flow batteries are provided. Many of these compounds are found to mitigate the effects of crossover in a flow battery. Other structure for improving battery performance is provided.

14 Claims, 36 Drawing Sheets

At the positive electrode:
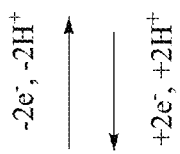 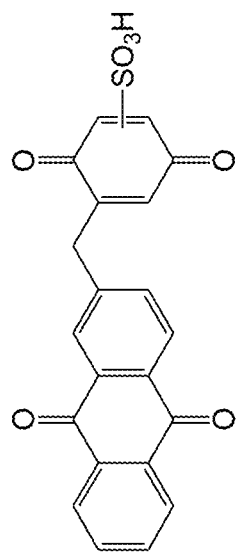 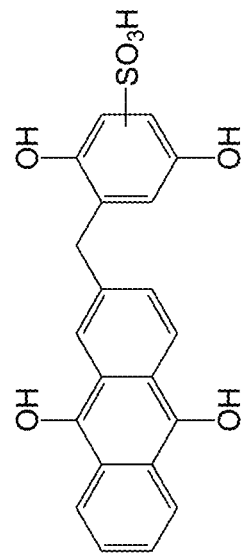
At the negative electrode:
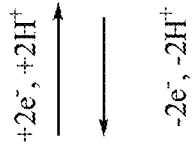 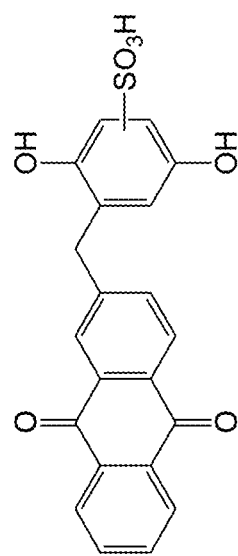 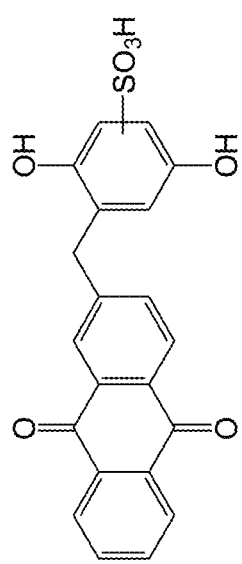
Fig. 3A

- Friedel-Crafts
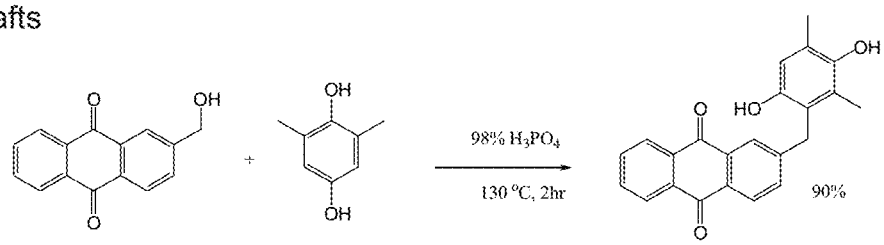
- Sulfonation
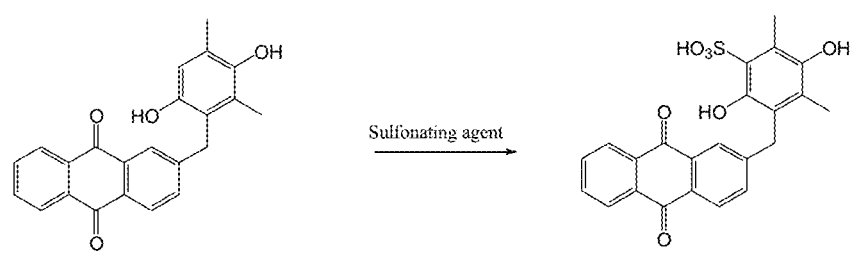
Fig. 3C

Electrochemical Properties of the dimethyl-substituted benzoquinone sulfonic acids

| Name | Structure | Mol. Weight (g/mol.) | Redox Potential, $E_{1/2}$ vs. NHE, Volts | Diffusion Coefficient, $D_o$, $cm^2 s^{-1}$ | Rate Constant, $k_0$, $cm\,s^{-1}$ |
|---|---|---|---|---|---|
| 3,5-dimethyl, 6-sulfo, p-benzoquinol | | 21.8 | 0.82 | $2.82 \times 10^{-6}$ | $1.3 \times 10^{-4}$ |
| 3-sulfo, 4,6-dimethyl, o-benzoquinol | | 218 | 0.89 | $5.02 \times 10^{-6}$ | $9.7 \times 10^{-4}$ |
| 3,5-disulfo 4,6-dimethyl o-benzoquinol | | 298 | 1.1 | $2.49 \times 10^{-6}$ | $5.25 \times 10^{-4}$ |

Fig. 22

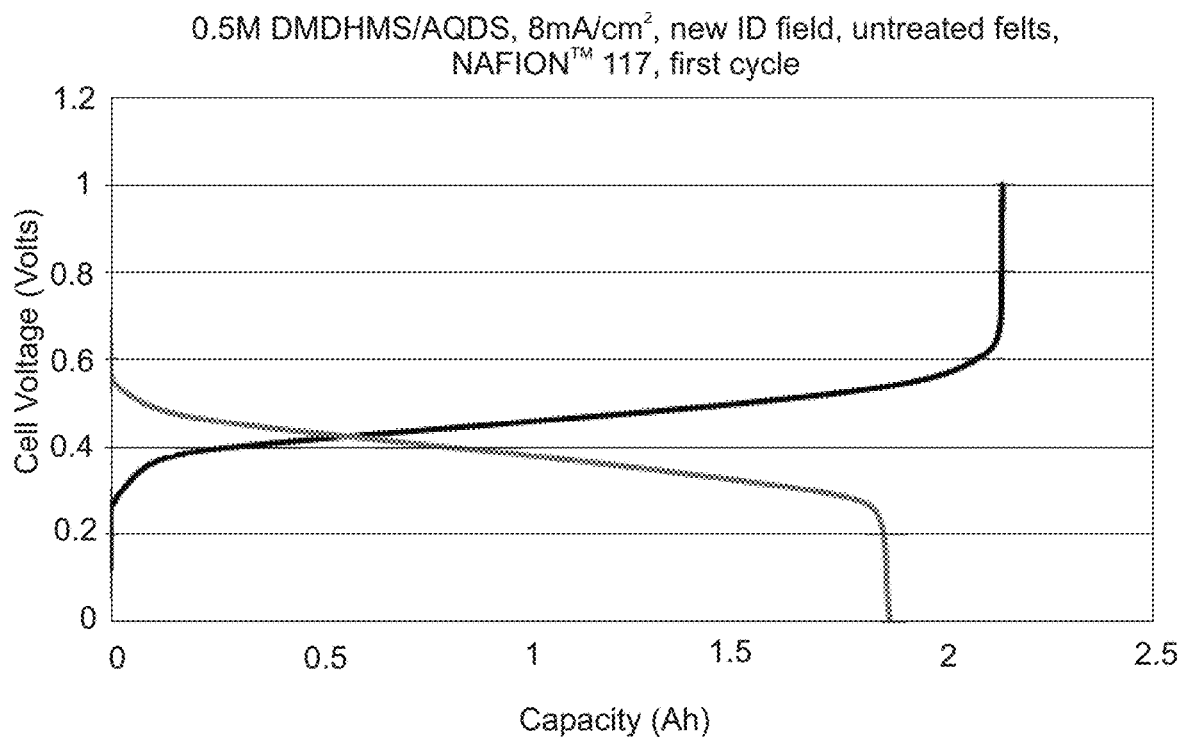
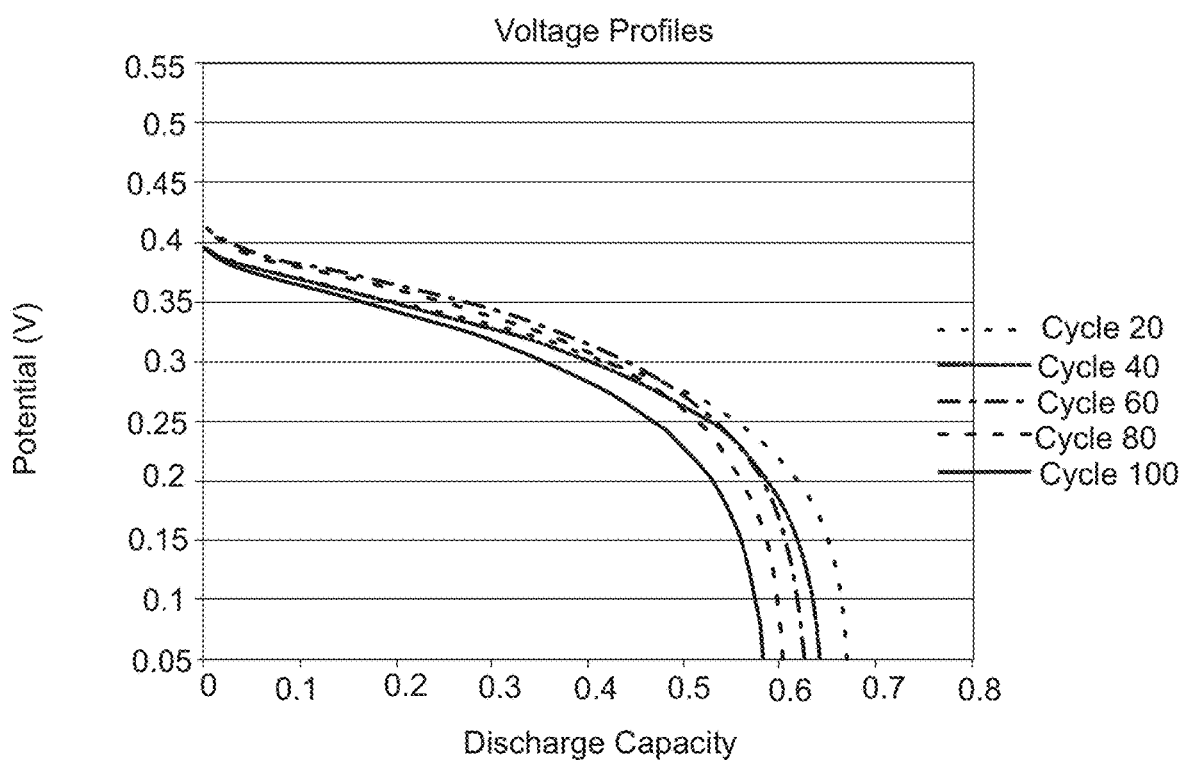
Fig. 25

Michael Reaction
Addition of Nucleophile to α,β-unsaturated carbonyl compound leads to irreversible changes Nucleophilic attack by hydroxide leads to formation of hydroxylated products.

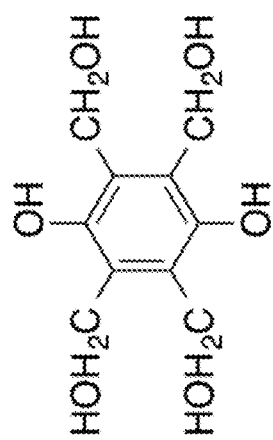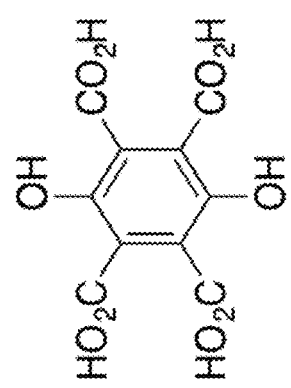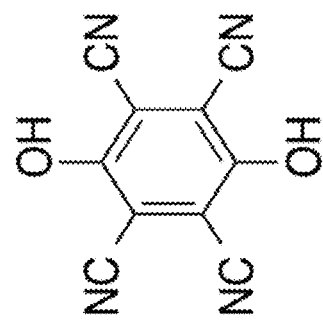
Fig. 27

MATERIALS FOR HIGH-PERFORMANCE AQUEOUS ORGANIC REDOX FLOW BATTERIES

CROSS-REFERENCE TO RELATED APPLICATIONS

This application claims the benefit of U.S. provisional application Ser. No. 62/403,004 filed Sep. 30, 2016, the disclosure of which is hereby incorporated in its entirety by reference herein.

STATEMENT REGARDING FEDERALLY SPONSORED RESEARCH OR DEVELOPMENT

This invention was made with government support under DE-AR0000353 awarded by the Department of Energy/ARPA. The government has certain rights in the invention.

TECHNICAL FIELD

The present invention is related to metal-free organic redox flow batteries.

BACKGROUND

The integration of electrical energy generated from solar and wind power into the grid is faced with the challenge of intermittent electricity output from these sources. This challenge can be effectively met by storing the electricity during times of excess production and releasing the electrical energy to the grid during times of peak demand. Rechargeable batteries are very attractive for energy storage because of their high energy efficiency and scalability. Since grid-scale electrical energy storage requires hundreds of giga-watt-hours to be stored, the batteries for this application must be inexpensive, robust, safe and sustainable. None of today's mature battery technologies meet all of these requirements.

Accordingly, there is a need for improvements in redox flow batteries that are inexpensive, robust, safe and sustainable.

SUMMARY

The present invention solved one or more problems of the prior art by providing a flow battery that uses two different water-soluble organic redox couples to store electrical energy. The flow battery includes a positive electrode, a positive electrode electrolyte, a negative electrode, and a negative electrode electrolyte. The positive electrode electrolyte includes water and a first redox couple with the positive electrode electrolyte flowing over and contacting the positive electrode. The first redox couple includes an organic compound having formula I and a reduction product of the organic compound where the organic compound having formula I is reduced during discharge. Similarly, the negative electrode electrolyte includes water and a second redox couple, the negative electrode electrolyte flowing over and contacting the positive electrode. The second redox couple also includes an organic compound having formula I where a reduction product of the organic compound having formula I is oxidized during discharge:

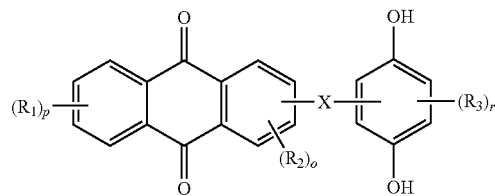

wherein:
p is 0, 1, 2, 3, or 4;
o is 0, 1, 2, or 3;
r is 0, 1, 2, or 3;
$R_1$, $R_2$, $R_3$ are each independently —$SO_3H$, —$SO_3Na$, —$SO_3K$, —$CO_2H$, —$CO_2Na$, —$CO_2K$, —OH, —OMe, alkyl, $(CH_2CH_2O)_n$OMe, $NH_2$, $NMe_2$, I, Cl, Br, F, —$CF_3$, —$CF_2H$, —$NO_2$, —$N(R)_3^+X_1^-$, $CCl_3$, —CN, —$PO_3H_2$, —COOH, —$O^-M^+{}_2$, —$SO_3^-M^+$, —$PO_3{}^{2-}M^+{}_2$, —$COO^-M^+$, —COOR, —CHO, or —COR where R is H or $C_{1-10}$ alkyl, $M^+$ is a positively charged counter-ion, and $X_1^-$ is a negatively charge counter-ion;
X is —$(CH_2)_n$—, —$(CH_2OCH_2)_n$—, $C_{4-15}$ branched alkyl chains or other substituted alkyl chains; and
n is 1 to 10.

In another embodiment, a flow battery is provided. The flow battery includes a positive electrode, a positive electrode electrolyte, a negative electrode, and a negative electrode electrolyte. The positive electrode electrolyte includes water and a first redox couple. The positive electrode electrolyte flows over and contacts the positive electrode. The first redox couple includes an organic compound having formula II and a reduction product of the organic compound. Characteristically, the organic compound having formula II is reduced during discharge. The negative electrode electrolyte includes water and a second redox couple. The negative electrode electrolyte flows over and contacts the positive electrode. The second redox couple also includes an organic compound having formula II. Characteristically, a reduction product of the organic compound having formula II is oxidized to the organic compound during discharge:

A—X—B wherein:
A is a substituted or unsubstituted flavins with substituents, quinoxaline with and without substituents, substituted anthraquinones, and substituted naphthaquinones; and
B is a substituted quinone. The organic compound having formula II in the first redox couple and the second couple can be the same or different.

In another embodiment, a flow battery is provided. The flow battery includes a positive electrode, a positive electrode electrolyte, a negative electrode, and a negative electrode electrolyte. The positive electrode electrolyte including water and a first redox couple. The positive electrode electrolyte flows over and contacts the positive electrode. The first redox couple includes a first organic compound and a reduction product of the first organic compound. Characteristically, the first organic compound is reduced during discharge. The negative electrode electrolyte includes water and a second redox couple. The negative electrode electrolyte flows over and contacts the positive electrode. The second redox couple also includes a second organic compound. Characteristically, a reduction product of the second organic compound is oxidized to the second organic compound during discharge, one or both of the first organic compound and the second organic compound including a compound selected from the group consisting of:

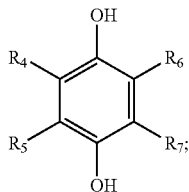
III

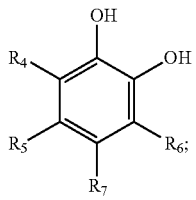
IV

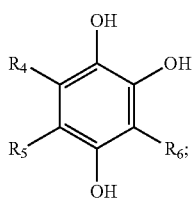
V and combinations thereof
wherein $R_4$, $R_5$, $R_6$, and $R_7$ are each independently H,

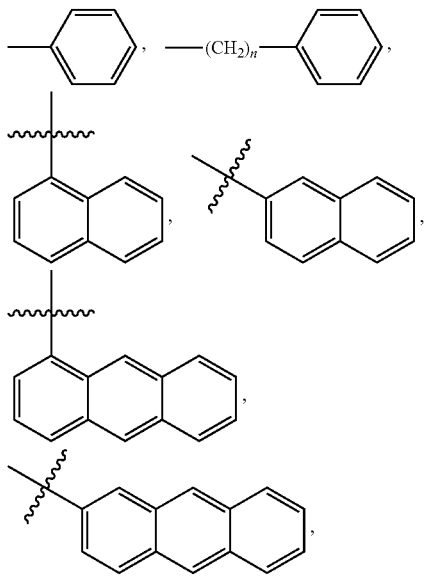

—$SO_3H$, —$SO_3Na$, —$SO_3K$, —$CO_2H$, —$CO_2Na$, —$CO_2K$, —OH, —OMe, alkyl, $(CH_2CH_2O)_n$OMe, $NH_2$, NMe2, I, Cl, Br, F, —$CF_3$, —$CF_2H$, —$NO_2$, —$N(R)_3^+X_1^-$, $CCl_3$, —CN, —$PO_3H_2$, —COOH, —$O^-M^+_2$, —$SO_3^-M^+$, —$PO_3^{2-}M^+_2$, —$COO^-M^+$, —COOR, —CHO, or —COR where R is H or $C_{1-10}$ alkyl, $M^+$ is a positively charged counter-ion, and $X_1^-$ is a negatively charge counter-ion.

In still another embodiment, a flow battery that is resistant to the Michael reaction is provided. The flow battery includes a positive electrode, a positive electrode electrolyte, negative electrode, and a negative electrode electrolyte. The positive electrode electrolyte includes water and a first redox couple. The positive electrode electrolyte flows over and contacts the positive electrode. Characteristically, the first redox couple includes a first organic compound and a reduction product of the first organic compound where the first organic compound is reduced during discharge. The negative electrode electrolyte includes water and a second redox couple. The negative electrode electrolyte flows over and contacts the positive electrode. Characteristically, the second redox couple also includes a second organic compound. A reduction product of the second organic compound is oxidized to the second organic compound during discharge. One or both of the first organic compound and the second organic compound include a compound selected from the group consisting of:

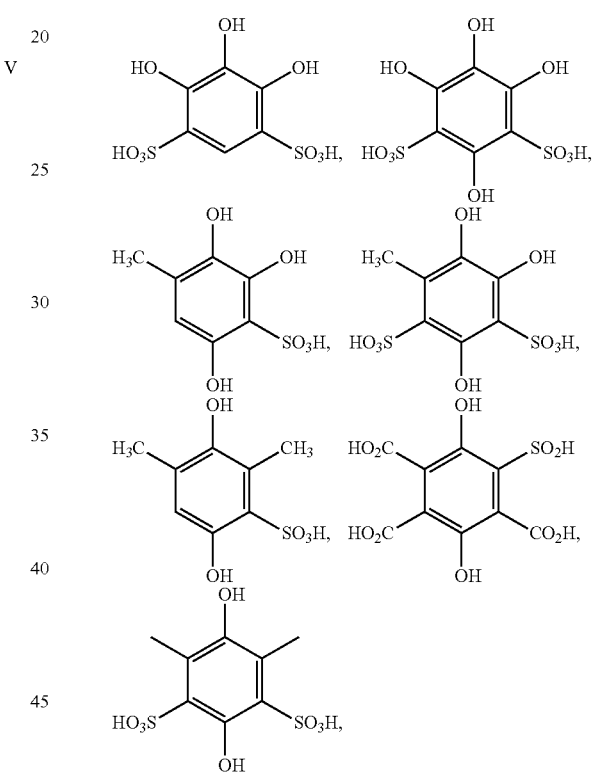

and combinations thereof.

Advantageously, the flow battery of this embodiment uses only organic materials without any metals is expected to be inexpensive, robust and eco-friendly for large-scale storage of electrical energy generated by solar photovoltaic and wind turbines. Advantageously, embodiments of the invention address the problem of crossover by using a single molecule that is bifunctional and can operate at both electrodes. Therefore, even if crossover occurred from the positive to the negative side, the performance will not be affected. Some embodiments address the issue of crossover of redox active species by tailoring the size of the molecules used at the positive to the negative side by the use of bulky substituent groups. Transformation and degradation of the redox active materials is reduced by using new molecular architectures that do not undergo the Michael Reaction. Characteristically, embodiments of the invention use identical solution mixture of molecules of redox couples at both the positive and negative electrodes and ion exchange membranes that have the appropriate water content that ensures that the size of the hydrophilic clusters is small enough to prevent molecular crossover. Moreover, the present invention certain embodiments can operate in an alkaline environment that allows the cost of the battery to be lowered. Finally, certain electrode structures of the invention allow for the increased utilization of the active materials and improved transport of materials to the surface of the electrode.

BRIEF DESCRIPTION OF THE DRAWINGS

FIG. 3A. Reactions of the redox couple during charge and discharge at the positive and negative electrode.

FIG. 3C. Synthesis of bifunctional redox molecule.

FIG. 22. Electrochemical Properties of Selected Molecules that are resistant to the Michael Reaction.

FIG. 25. Cycling of redox flow cells with 0.5 M 2,5-dimethyl-1,4-dihydroxybenzene-3-sulfonic acid and 0.5 M anthraquinone-2,7-disulfonic acid.

FIG. 27. Compounds that resist Michael Addition and suitable for use in alkaline electrolyte.

DETAILED DESCRIPTION

Figure 1:
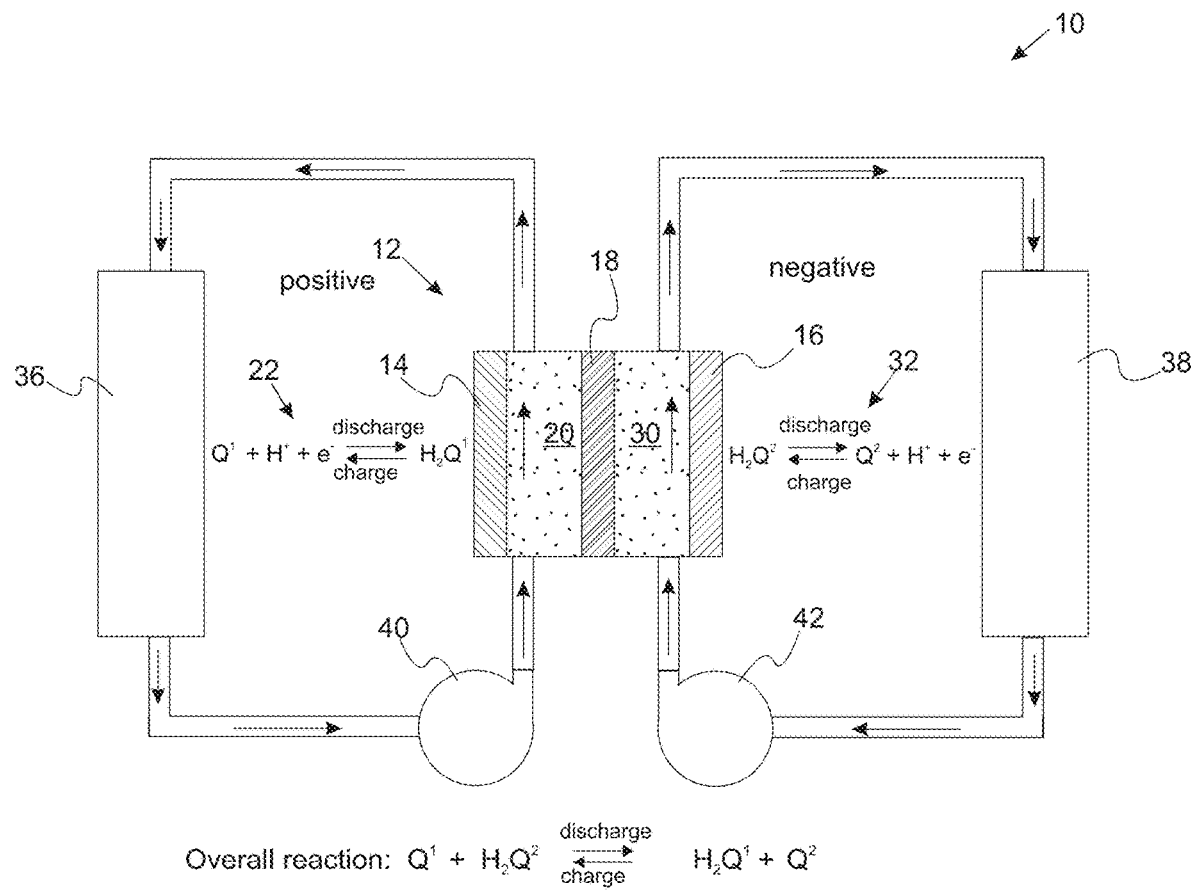
FIG. 1 provides a schematic illustration of a flow battery that includes electrolytes that include quinones and hydroquinones.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include alkyl, lower alkyl, $C_{1-6}$ alkyl, $C_{6-10}$ aryl, or $C_{6-10}$ heteroaryl; single letters (e.g., "n" or "o") are 1, 2, 3, 4, or 5; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

As used herein "alkyl" refers to $C_{1-20}$ inclusive, linear (i.e., "straight-chain"), branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. The alkyl group can be optionally substituted (i.e., a "substituted alkyl") with another atom or functional group such as alkyl, substituted alkyl, halogen, aryl, substituted aryl, alkoxyl, hydroxyl, nitro, amino, alkylamino, dialkylamino, sulfate, mercapto, and the like.

As used herein "aryl" means a monovalent aromatic hydrocarbon having a single ring (i.e., phenyl) or fused rings (i.e., naphthalene). In a refinement, such aryl groups include from 6 to 12 carbon ring atoms. In another refinement, such aryl groups include 6 to 10 carbon ring atoms. Representative aryl groups include, by way of example, phenyl biphenyl, naphthyl, anthranyl, and naphthalene-1-yl, naphthalene-2-yl, and the like. The term "arylene" means a divalent aryl group.

As used herein "heteroaryl" means a monovalent aromatic group having a single ring or two fused rings and containing in the ring at least one heteroatom (typically 1 to 3 heteroatoms) selected from nitrogen, oxygen or sulfur. In a refinement, heteroaryl groups typically contain from 5 to 10 total ring atoms. In a refinement, heteroaryl groups have from 6 to 16 total ring atoms. In a refinement, the heteroaryl is a $C_{5-12}$ heteroaryl. Examples of heteroaryl include, but are not limited to, monovalent species of pyrrole, imidazole, thiazole, oxazole, furan, thiophene, triazole, pyrazole, isoxazole, isothiazole, pyridine, pyrazine, pyridazine, pyrimidine, triazine, indole, benzofuran, benzothiophene, benzimidazole, benzthiazole, quinoline, isoquinoline, quinazoline, quinoxaline and the like, where the point of attachment is at any available carbon or nitrogen ring atom. Additional examples heteroaryl groups include, but are not limited to, furanyl, thienyl, and pridinyl group. The term "heteroarylene" means a divalent heteroaryl group.

Abbreviations

"AQDS" means anthraquinone-2,7-disulfonic acid.
"BQDS" means 2,6-dimethyl-1,4-dihydroxy benzene 3-mono-sulfonic acid, 1,2-dihydroxybenzene-3,5-disulfonic acid.
"DHA" means dihydroxyanthraquinone.
"DMDHMS" means 2,6-dimethyl-1,4-dihydroxybenzene-3-sulfonic acid.
"HQTC" means hydroquinonetetracarboxylic acid.
"MMO" means mixed metal oxide.
"p-TSA" means para-toluene sulfonic acid.

Figure 2:
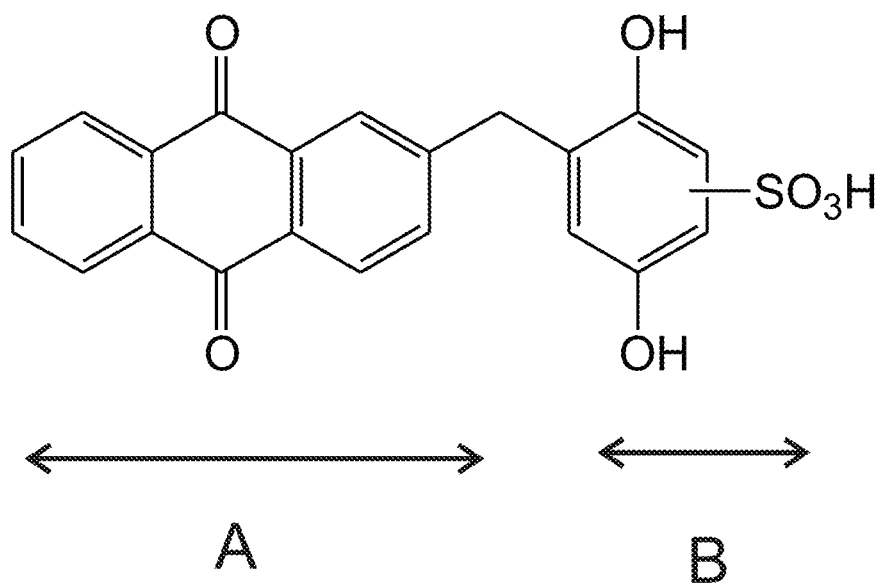
FIG. 2. Structure of Bi-functional redox material, 2-anthraquinonemethyl (p-benzoquinol sulfonic acid) or AMBSA for short. A is the negative electrode portion and B the positive electrode portion.

With reference to FIG. 1, a schematic illustration of a flow battery that includes a pair of organic redox couples is provided. Flow battery 10 includes battery cell 12 which includes positive electrode 14, negative electrode 16, and polymer electrolyte membrane 18. In the context of a flow cell, reduction occurs during discharge at the positive electrode and oxidation occurs during discharge at the negative electrode. Conversely, oxidation occurs during charging at the positive electrode and reduction occurs during charging at the negative electrode. Polymer electrolyte membrane 18 is interposed between positive electrode 14 and negative electrode 16. Positive electrode electrolyte 20 includes water and a first redox couple 22. In FIG. 2, a first quinone redox couple is depicted as an example. Positive electrode electrolyte 20 flows over and contacts positive electrode 14. During discharge of the flow battery, the first organic compound $Q^1$ is reduced to the first reduction product $H_2Q^1$ of the first organic compound. During charging of the flow battery, the first reduction product $H_2Q^1$ is oxidized to the first organic compound $Q^1$. Negative electrode electrolyte 30 includes water and a second redox couple 32. Negative electrode electrolyte 30 flows over and contacts the negative electrode 16. In FIG. 1, a second quinone redox couple is depicted as an example. The second redox couple 32 includes a second organic compound $Q^2$ and a reduction product $H_2Q^2$ of the second organic compound. During discharge, the reduction product $H_2Q^2$ is oxidized to the second organic compound $Q^2$.

In an embodiment, a redox flow battery that uses the same organic redox molecule on both electrodes, i.e., for the first redox couple 22 and the second redox couple 32 of FIG. 1. This molecule is designed to have two separate functional redox parts. One redox active part of the molecule serves as the positive electrode material and the other redox active part as the negative electrode material. The standard reduction potential for each of these parts is distinctly different and identifiable with the redox reaction occurring in each of these parts. Such a molecule has been termed for the first time a "bi-functional redox active material". These two parts are isolated by at least one atom and is linked to the other parts by sigma bonds. The presence of pi-bonds or delocalization or mixing of the electronic energy states of the two sections of the molecule is avoided so that the standard electrode potential of the molecule has two distinct values. Such a molecule is embodied in the molecular structure shown below.

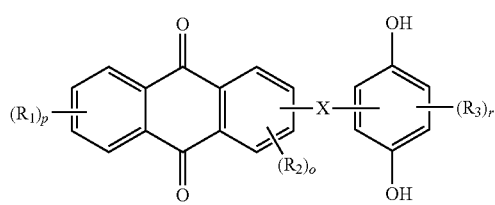

wherein:
p is 0, 1, 2, 3, or 4;
o is 0, 1, 2, or 3;
r is 0, 1, 2, or 3;
$R_1$, $R_2$, $R_3$ are each independently —$SO_3H$, —$SO_3Na$, —$SO_3K$, —$CO_2H$, —$CO_2Na$, —$CO_2K$, —OH, —OMe, alkyl, $(CH_2CH_2O)_n$OMe, $NH_2$, NMe2, I, Cl, Br, F, —$CF_3$, —$CF_2H$, —$NO_2$, —$N(R)_3^+X_1^-$, $CCl_3$, —CN, —$PO_3H_2$, —COOH, —$O^-M^+{}_2$, —$SO_3^-M^+$, —$PO_3^{2-}M^+{}_2$, —$COO^-M^+$, —COOR, —CHO, or —COR where R is H or $C_{1-10}$ alkyl, $M^+$ is a positively charged counter-ion, and $X_1^-$ is a negatively charge counter-ion;
X is —$(CH_2)_n$—, —$(CH_2OCH_2)_n$—, $C_{4-15}$ branched alkyl chains or other substituted alkyl chains; and
n is 1 to 10 (i.e., 1, 2, 3, 4, 5, 6, 7, 8, 9, or 10). In a refinement, n is 1, 2, 3, 4 or 5. It should be appreciated that multiple R groups on the same ring can be different substituents specified from the list provided selections. In a variation, one of the for the first redox couple 22 and the second redox couple 32 includes a compound having formula I. The counter electrode in this case can include a quinone as disclosed by U.S. patent application Ser. No. 14/307,030 filed Jun. 17, 2014; the entire disclosure of which is hereby incorporated by reference.

In a refinement, the $R_3$ are each independently H, —$NO_2$, —$CF_3$, or —$SO_3H$. In one refinement, at least one of $R_1$, $R_2$, $R_3$ is an electron withdrawing group that can increase the reduction potential of the compound having the group. In a refinement, 1, 2, or 3 of $R_3$ are electron withdrawing groups. Examples of such electron withdrawing groups include but are not limited to, —$NO_2$, —$N(R)_3^+X^-$, —$CF_3$, $CCl_3$, —CN, —$SO_3H$, —$PO_3H_2$, —COOH, —OH, —$O^-M^+$, —$SO_3^-M^+$, —$PO_3^{2-}M^+$, —$COO^-M^+$, —COOR, F, Cl, Br, —CHO, or —COR where R is H or $C_{1-10}$ alkyl, $M^+$ is a positively charged counter-ion (e.g., $Na^+$, $K^+$, and the like). As described herein, when electron withdrawing groups are used as substituents for organic compounds in the negative electrode electrolyte such groups can provide further separation from the reduction potential of the positive electrode electrolyte. In another refinement, $R_1$, $R_2$ include one or more (e.g., 1, 2, 3 or 4) electron donating group. Examples of such electron donating groups include, but are not limited to, $C_{1-10}$ alkyl, $NH_2$, —NHR, —$N(R)_2$, —$O^-M^+{}_2$, —NH-COR, —OR, —$CH_3$, —$C_2H_5$, or phenyl where R is H or $C_{1-10}$ alkyl and $M^+$ is a positively charged counter ion. In still another refinement, at least one of $R_1$, $R_2$, $R_3$ is a functional group that increases water solubility. Examples of such functional groups include, but are not limited to, —$SO_3H$, —$PO_3H_2$, —COOH, —OH, —$O^-M^+$, —$SO_3^-M^+$, —$PO_3^{2-}M^+{}_2$, —$COO^-M^+$, pyridinyl, imidazoyl, or pyrroyl, where $M^+$ is a positively charged counter ion (e.g., $Na^+$, $K^+$, or the like).

Figure 3B:
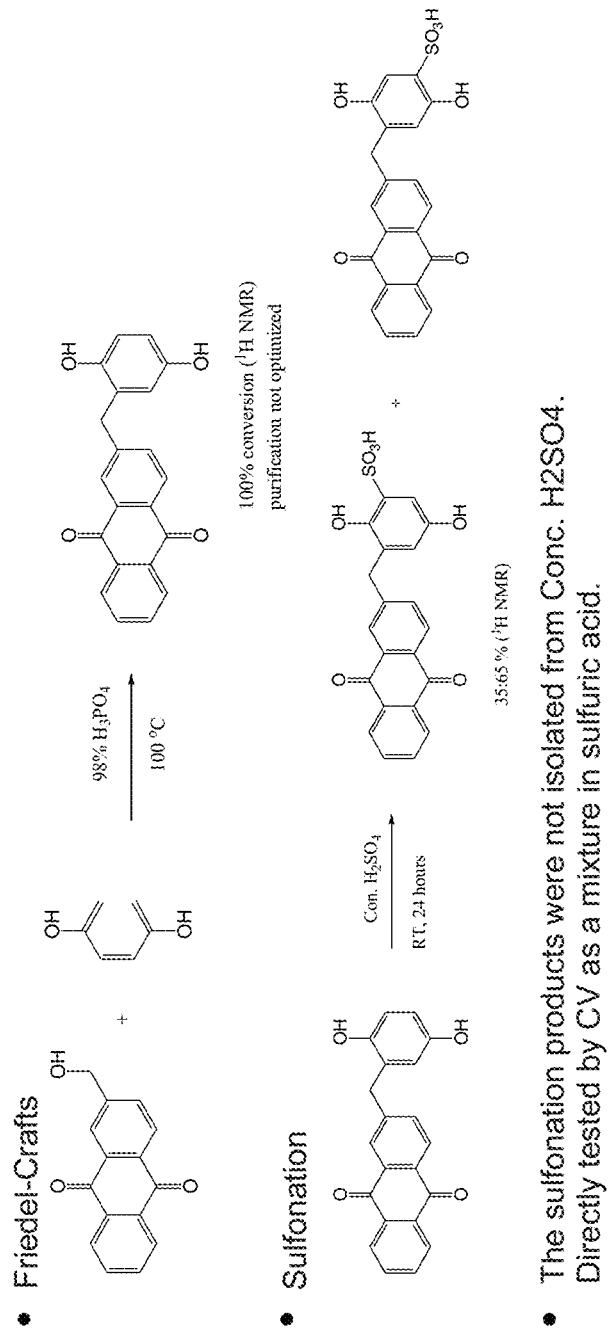
FIG. 3B. Synthesis of bifunctional redox molecule.

The principal advantages of the compounds of the present embodiment is that only one type of material is used in the electrochemical cell, and thus, when crossover of the molecule from the positive to the negative electrode occurs, the issue of contamination of the sides is no longer relevant. An example of such a molecule is what we have synthesized and shown in FIG. 2. The synthetic procedure for this molecule and similar molecules is also described in Schemes 1 and 2. In FIG. 2, a molecule with the section marked A serves as the active material for the negative electrode, and section B serves as the material for the positive electrode. The two sections are linked by a methylene group. By using a saturated linker, the reduction potentials of the sections become separately observable. Therefore, such molecules can be designed by selecting the properties of the individual A and B moieties. The most useful molecules will have a separation in electrode potential of >0.5 V to be useful in storing large quantities of energy. Examples of such redox couples and their reactions are shown in FIG. 3A. Synthetic procedure for the molecule in FIGS. 3B and 3C and another variant of this type of molecule are described in Schemes 1 and 2.

Figure 4:
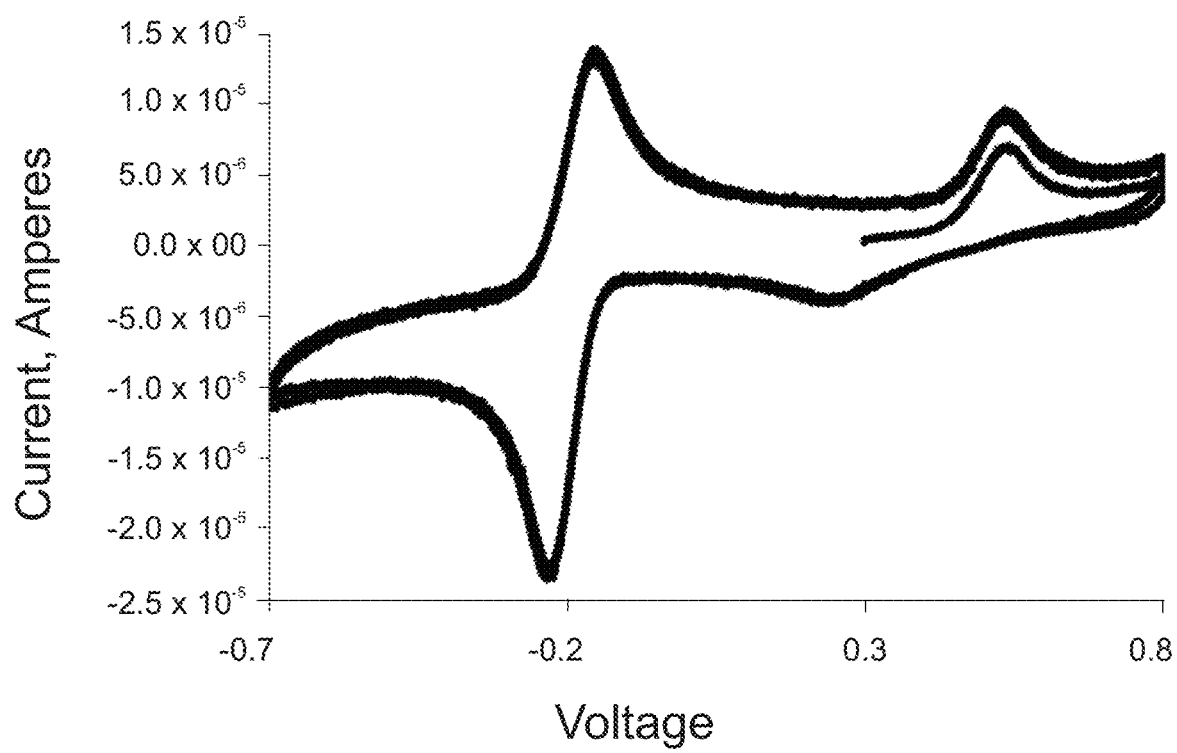
FIG. 4. Cyclic voltammogram of AMBSA showing two sets of redox peaks.
Figure 5:
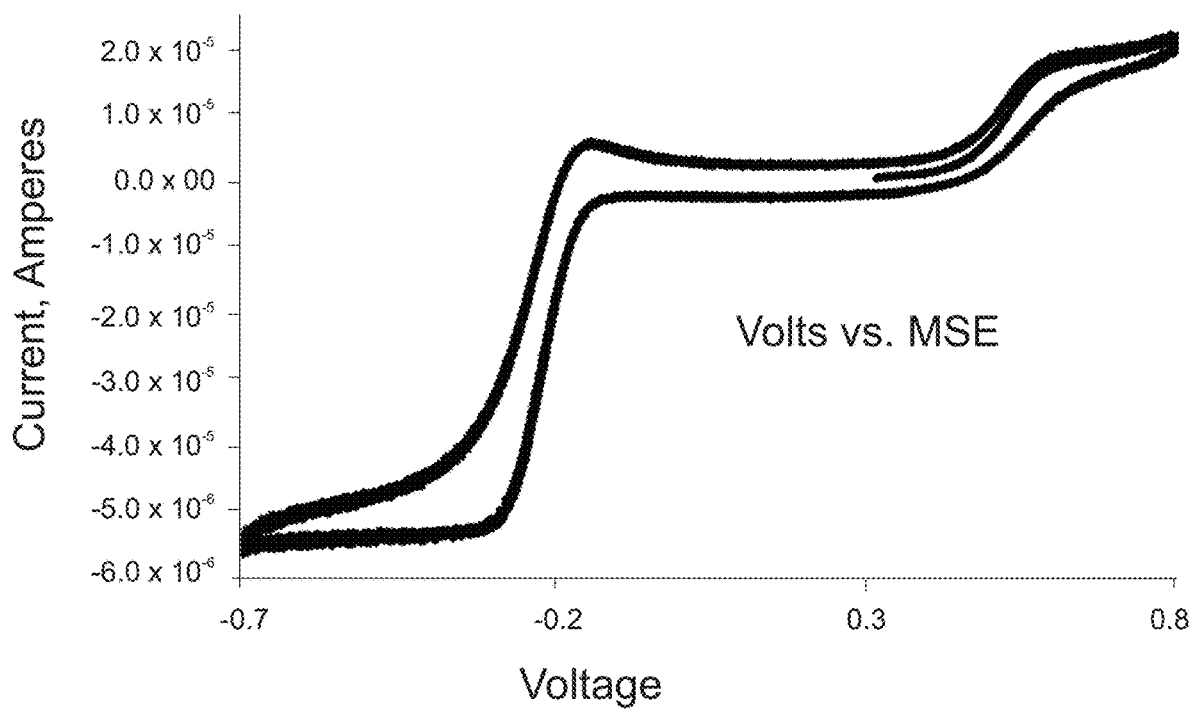
FIG. 5. Rotating disk electrode study of AMBSA in sulfuric acid electrolyte.

The molecule AMBSA shown in FIG. 2 has been synthesized. The cyclic voltammogram of this molecule (FIG. 4) shows two distinct peaks. Shown in FIG. 5 are the results of the testing of the new AMBSA bifunctional redox material at a rotating disk electrode. The two plateaus in current refer to the reduction of the anthraquinone moiety and the oxidation of the hydroquinone moiety. AMBSA is only one example of such a bi-functional redox couple. Any two moieties that have redox properties that can be coupled through a covalent bond that does not cause delocalization of the molecular orbitals of the two redox couples will be able to function as a bi-functional redox couple. For the molecule AMBSA let us designate the moiety A as AQS and moiety B as BQS. Let the reduced forms of moieties A and B be AQSH and BQSH. In an operating redox cell, the redox states of the molecules are listed in Table 1.

TABLE 1

Redox States of the molecule AMBSA during charge and discharge:

| State | Positive electrode | Negative electrode | Cell Voltage |
|---|---|---|---|
| Fully Charged | (BQS-AQS) | (BQSH-AQSH) | 0.8-1.0 |
| Fully Discharged | (BQSH-AQS) | (BQSH-AQS) | 0.0 |

For these compounds, even if the materials crossover during charge or discharge, they will be similar in nature to the materials already present in the compartments. Therefore, no additional purification or separation will be needed.

In another embodiment, the other bifunctional compounds to be used in the positive and negative electrodes or electrolytes of the flow cell depicted in FIG. 1 (i.e., for the first redox couple 22 and the second redox couple 32) are represented by:

A—X—B  II wherein A is a substituted or unsubstituted flavins with substituents, quinoxaline with and without substituents, substituted anthraquinones, and substituted naphthaquinones; and B is a substituted quinone. In this family, the rings in the A part can be substituted with 1, 2, 3, 4, 5, or 6 (or each integer from 0 up to the number of replaceable hydrogen atoms) substituents set forth above with respect to the compound having formula I including the electron donating and electron withdrawing groups disclosed there. The B part of this molecule may be selected from substituted quinones, with methyl, hydroxyl, chloride, fluoride and carboxylic acid substituents rendered soluble by sulfonation. U.S. patent application Ser. No. 14/307,030 filed Jun. 17, 2014 discloses substituted quinones that can be used for the B part; the entire disclosure of that patent application is hereby incorporated by reference. Further other redox couple moieties with reversible electrochemical behavior and different standard reduction potentials that are about 0.4 V to 1.2 V apart can be combined to yield a bifunctional redox active materials or electrolytes.

Figure 6:
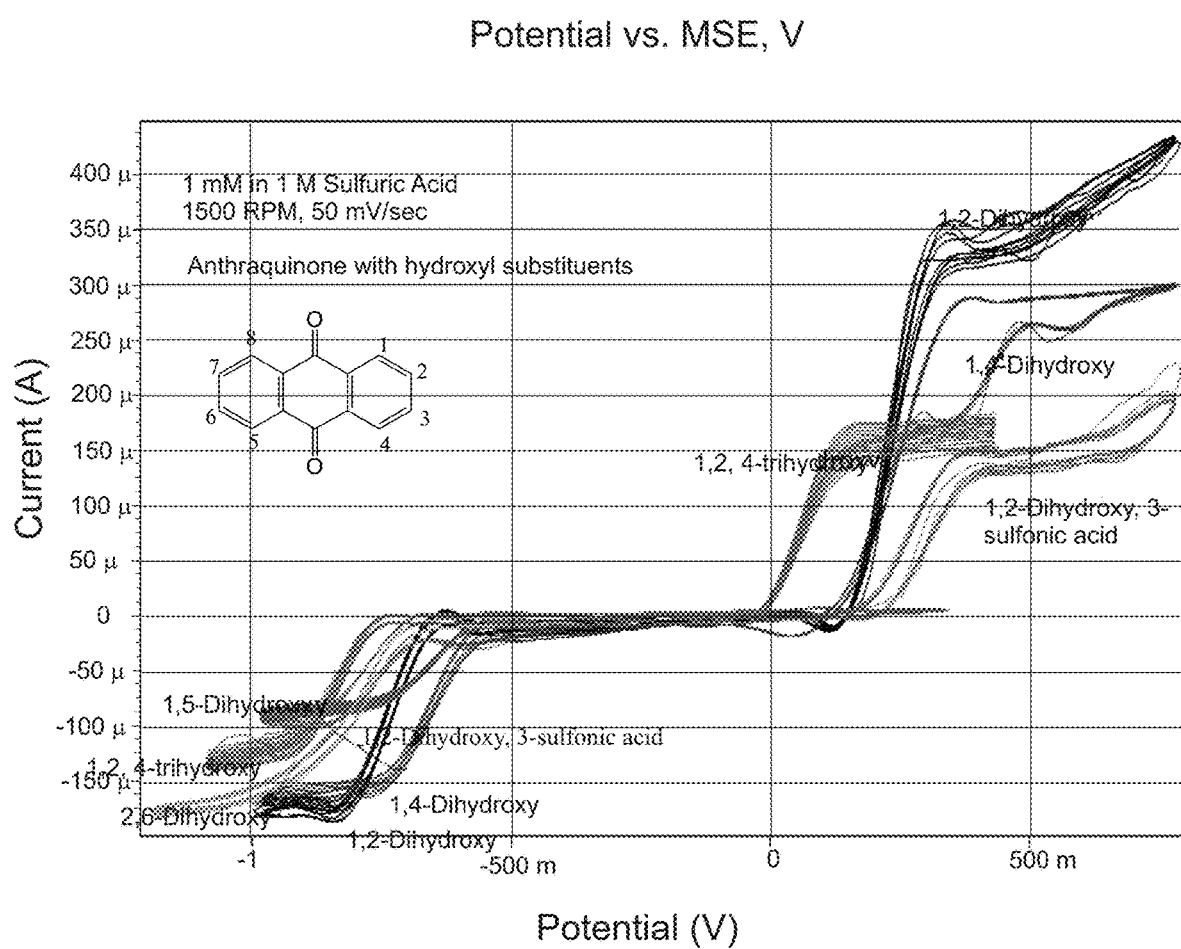
FIG. 6. Electrochemical properties of substituted anthraquinones over the potential range of −0.5 V to 1.0 V vs. the mercury sulfate reference electrode at a concentration of 1 mM.
Figure 7:
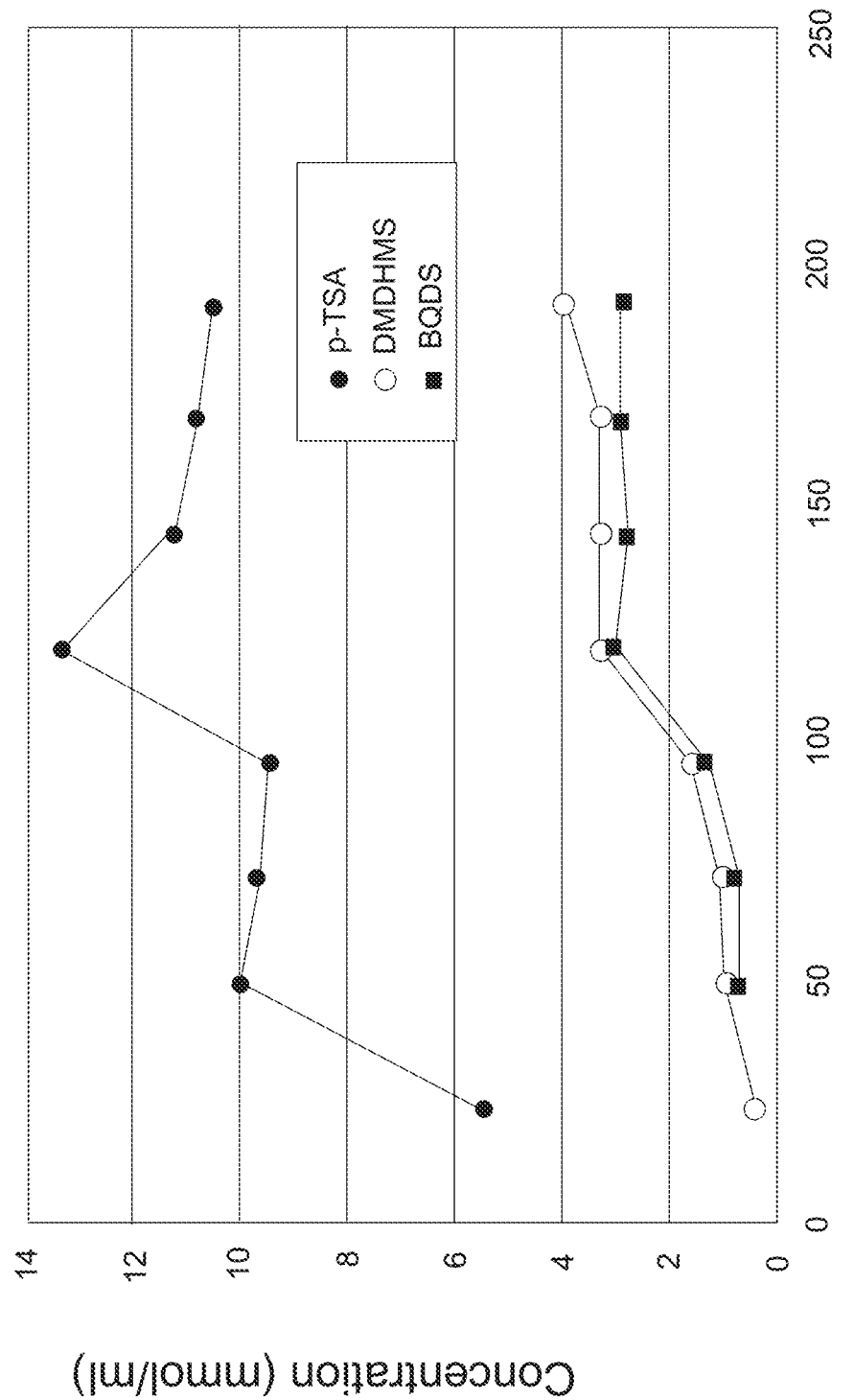
FIG. 7. Rate of crossover of various substances across NAFION® 117 membrane.

Bifunctional redox molecules can also be a molecule with different redox properties in various ranges of potentials. This type of molecule is typified by the substituted hydroxy anthraquinones. In this regard, redox properties of several substituted anthraquinones have been studies. Electrochemistry experiments on the rotating disk electrode confirm the existence of two diffusion limited regions separated by a significant potential difference of 0.5 V to 1.0 V for certain types of substitutions (FIG. 6). For these molecules, two different redox processes occur at different potentials. Those molecules which have hydroxyl substituents in positions such as 1,2- and 1, 4- are particularly suitable for this purpose.

In Table 2 below we summarize the properties of these types of substituted anthraquinones that can be used on both as positive and negative electrode materials and others that have similar moieties but are not suitable for this type of deployment. The use of these molecules is suitable for use both acidic and alkaline media as shown by the rotating electrode studies.

TABLE 2

Electrochemical properties of the hydroxyl-substituted anthraquinones. Hydroxy Anthraquinonesin NaOH

| Compound | $E_{1/2}$(Volts) vs MMO | Di-Couple Potential |
| --- | --- | --- |
| 1,2,4-trihydroxy anthraquinone | −0.84 V | Yes, 840 mV difference |
| 2,6-dihydroxy anthraquinone | −0.8 V | No |
| 1,5-dihydroxy anthraquinone | −0.65 V | No |
| 1,4-dihydroxy anthraquinone difference1,2-dihydroxy anthraquinone | −0.63 V −0.73 V | Yes, 880 mV difference Yes, 1 V difference |
| 1,2-dihydroxy, 3-sulfonic acid anthraquinone | −0.75 V | Yes, 930 mV difference |

The description of the bifunctional redox active materials for the flow batteries described herein is not restricted to soluble materials. Insoluble materials can be used to form electrode structures by combining with a conductive material such as carbon and a binder material such as polyvinylidene fluoride. Such electrodes can be assembled into batteries with aqueous or non-aqueous liquid electrolytes, gelled electrolytes or solid electrolytes. Such configurations include coin cells, pouch cells, prismatic, spirally-wound and tubular designs.

In another embodiment, compounds for the first redox couple 22 and/or the second redox couple 32 of FIG. 1 that reduce crossover between the anode and cathode compartments are provided. The crossover of the redox active species across the cell is largely determined by the molecular size. Examples of the redox compounds of this embodiment include, but are not limited to, para-toluene sulfonic acid (p-TSA), 2,6-dimethyl-1,4-dihydroxy benzene 3-mono-sulfonic acid, 1,2-dihydroxybenzene-3,5-disulfonic acid (BQDS), and anthraquinone-2,7-disulfonic acid (AQDS). The rate of crossover of the various types of positive electrode materials through a NAFION® 117 membrane was measured. The concentration of p-TSA appearing by crossover through the membrane is found to be much higher than that of the DMDHMS and BQDS (FIG. 6). AQDS was not detected at all suggesting no measurable crossover in 192 hours. The crossover rate measured over a period of 192 hours provided a rank order of p-TSA>DMDHMS≈BQDS>>AQDS. This rank order correlates with molecular size. The molecules of smaller size will diffuse more readily through the proton conducting membrane. Therefore, it is claimed that by modifying the size of the molecule we can suppress or reduce crossover. The redox active molecules that are prone to crossover may be modified in the size by either applying substituent groups. Such substituent groups can be simple methyl groups, sulfonic acid groups, alkyl groups, branched alkyls such as tertiary butyl, aromatic groups such as phenyl or benzyl groups, multi-ring aromatic groups such as naphthyl, anthracenyl (with or without substituents) amino, quaternary amino, keto, carboxyl and quinone groups. Examples of such redox active molecules with substituents that are enhanced in molecular size include the following compounds having formula II, III, and IV:

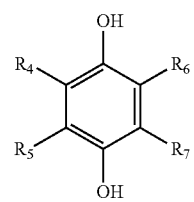

III

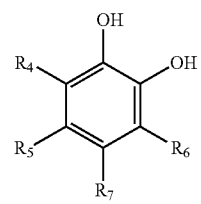

IV

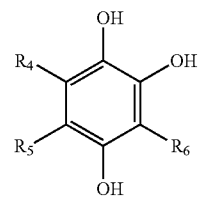

V wherein $R_4$, $R_5$, $R_6$, and $R_7$ are each independently H,

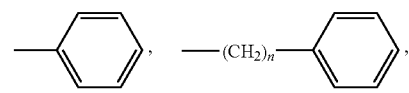

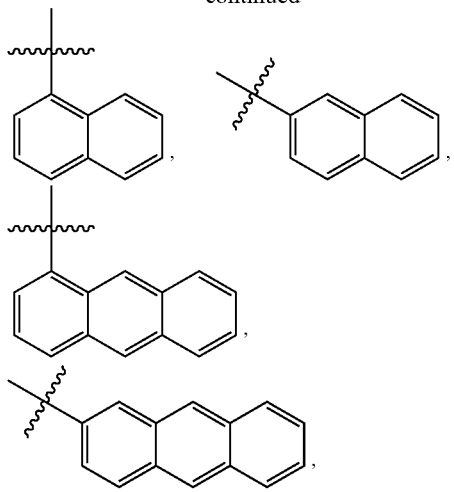

—SO$_3$H, —SO$_3$Na, —SO$_3$K, —CO$_2$H, —CO$_2$Na, —CO$_2$K, —OH, —OMe, alkyl, (CH$_2$CH$_2$O)$_n$OMe, NH$_2$, NMe2, I, Cl, Br, F, —CF$_3$, —CF$_2$H, —NO$_2$, —N(R)$_3^+$X$_1^-$, CCl$_3$, —CN, —PO$_3$H$_2$, —COOH, —O$^-$M$^+_2$, —SO$_3^-$M, —PO$_3^{2-}$M$^+_2$, —COO$^-$M+, —COOR, —CHO, or —COR where R is H or C$_{1-10}$ alkyl, M$^+$ is a positively charged counter-ion, and X$_1^-$ is a negatively charge counter-ion. For compounds II and III, 1, 2, 3 or 4 of R$_4$, R$_5$, R$_6$, and R$_7$ are the following cyclic groups

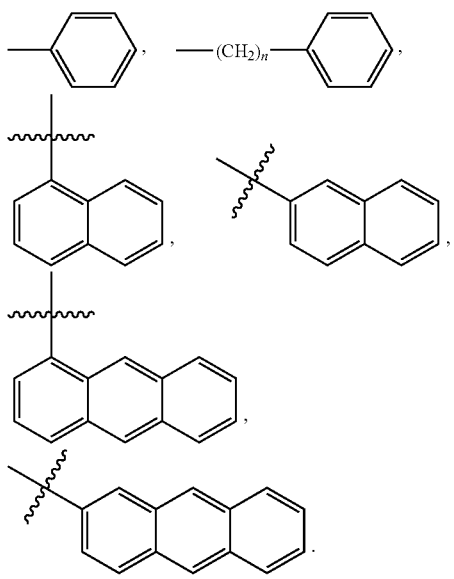

Similarly, for compounds IV, 1, 2 or 3 of R$_4$, R$_5$, and R$_6$ are these substituents. In a refinement, the cyclic groups are substituted with 1, 2, 3, 4, 5, 6, 7, 8 or 9 (if there are sufficient replaceable hydrogen atoms) of the following substituents: independently —SO$_3$H, —SO$_3$Na, —SO$_3$K, —CO$_2$H, —CO$_2$Na, —CO$_2$K, —OH, —OMe, alkyl, (CH$_2$CH$_2$O)$_n$OMe, NH$_2$, NMe2, I, Cl, Br, F, —CF$_3$, —CF$_2$H, —NO$_2$, —N(R)$_3^+$X$_1^-$, CCl$_3$, —CN, —PO$_3$H$_2$, —COOH, —O$^-$M$^+_2$, —SO$_3^-$M$^+$, —PO$_3^{2-}$M$^+_2$, —COO$^-$M+, —COOR, —CHO, or —COR where R is H or C$_{1-10}$ alkyl, M$^+$ is a positively charged counter-ion, and X$_1^-$ is a negatively charge counter-ion. In a specific refinement, the compound DMDHMS (2,6-dimethyl-1,4-dihydroxybenzene-3-sulfonic acid) and anthraquinone-2,7-disulfonic acid has been shown as an example of a molecule with larger size with reduced crossover.

Figure 8:
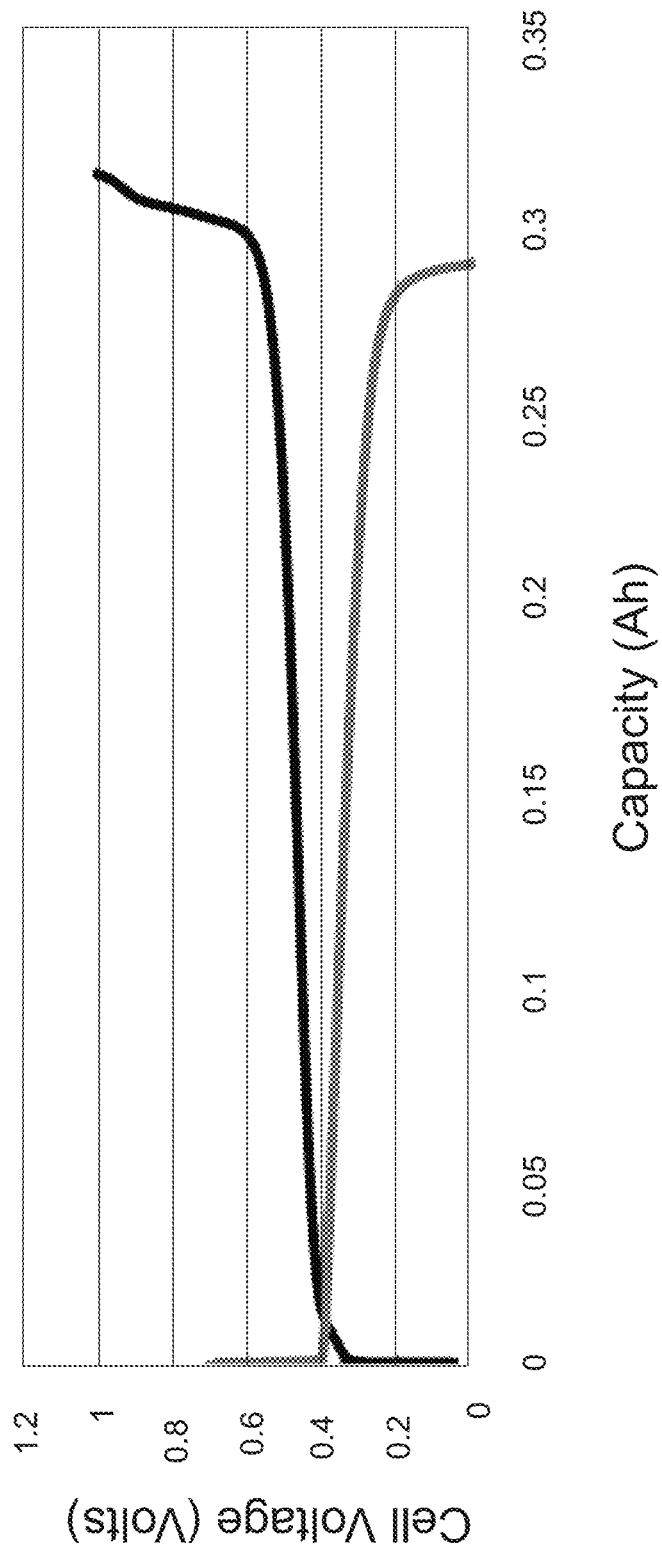
FIG. 8. Charge and discharge of cell with a mixture of DMDHMS and AQDS on both sides.

In another embodiment, the effects of crossover can be mitigated by using a mixture of positive and negative electrolyte materials in equimolar quantities at both the electrodes. When such a mixture is charged only the positive electrolyte component will undergo oxidation reaction at the positive electrode and the negative electrolyte material will undergo reduction reactions at the negative electrode. Since the concentration of the redox active species is identical even if crossover occurs, the positive electrolyte material occurred to the negative electrolyte side this change in concentration will be balanced by back diffusion. Thus, there might be self-discharge but no permanent capacity loss or compositional change of the electrolyte. Any two redox couples that qualify as positive and negative electrolyte materials can be mixed in equimolar proportions and used as the electrolyte. We have shown the feasibility of rechargeability of this type of mixed materials using DMDHMS and AQDS (FIG. 8). Nearly 100% of the charge input was returned during discharge.

In another variation, the effects of crossover are mitigated by adjusting properties of the ion exchange membrane. Advantageously, this variation can be deployed in each of the flow batteries described herein. In this variation, the differences in water content of the ion-exchange membranes is taken advantage of to avoid crossover. Cation exchange membranes vary in their water content based on the number of ionic groups present in the membrane. The number of ionic groups is given by the equivalent weight of the membrane, or the number of grams of the membrane that contains a mole of sulfonic acid or other ionizable acid groups. Table 3 shows the variation of water content of NAFION® membranes with different equivalent weights.

TABLE 3

The number of molecules of water associated with each ionic group in NAFION ® and Dow membranes of different equivalent weights (EW).

| Nafion | | Dow | |
| --- | --- | --- | --- |
| EW | Mol | EW | Mol |
| 850 | 35.1 | 800 | 36.8 |
| 1000 | 25.4 | 830 | 21.8 |
| 1200 | 19.9 | 1154 | 18.6 |
| 1400 | 16.9 | 1340 | 12.7 |
| 1600 | 14.0 | 1666 | 8.7 |

Figure 9:
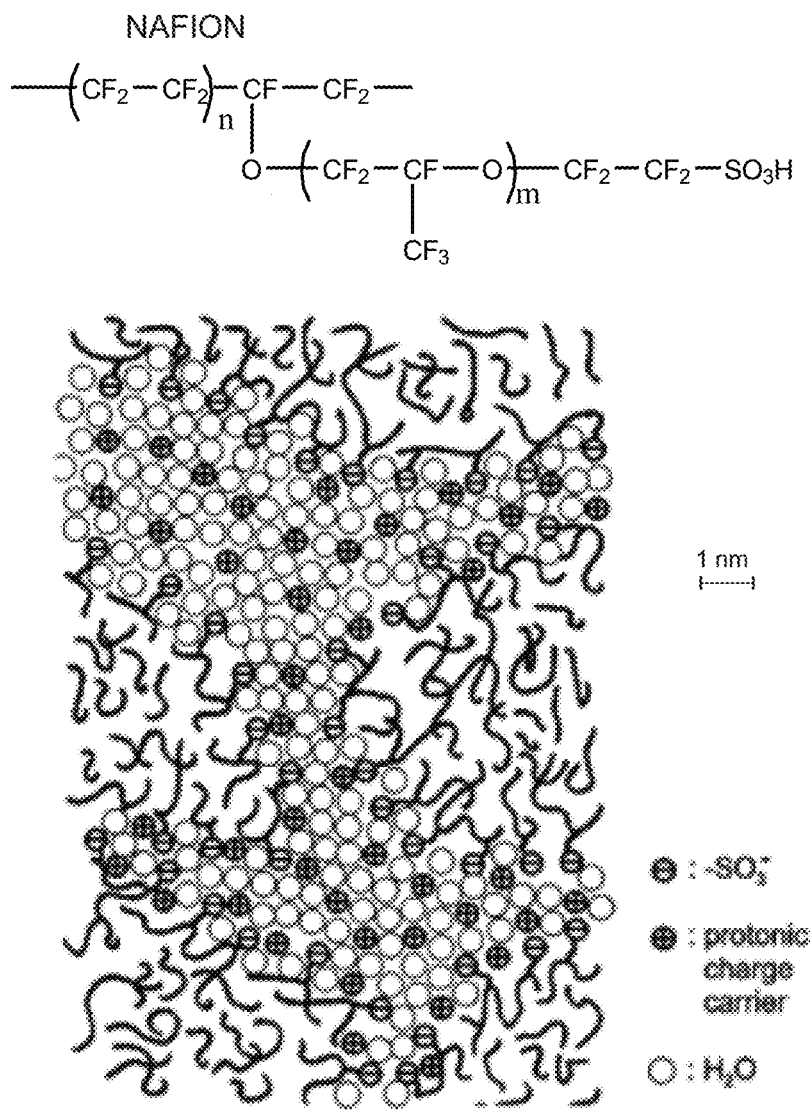
FIG. 9. Cluster of hydrophilic regions in NAFION® membrane through which water soluble organic molecules are expected to crossover.

The cluster size of the ionic or hydrophilic domains also varies considerably with the water content. The cluster size is of the order of a few nanometers and is shown schematically in FIG. 9. By reducing the water content, the cluster size can be reduced and molecules larger than the cluster size can be prevented from entering the membrane. Therefore, the equivalent weight of the ion exchange membrane with respect to sulfonic acid groups is greater than 1000 and typically between 1000 and 2000.

Figure 10:
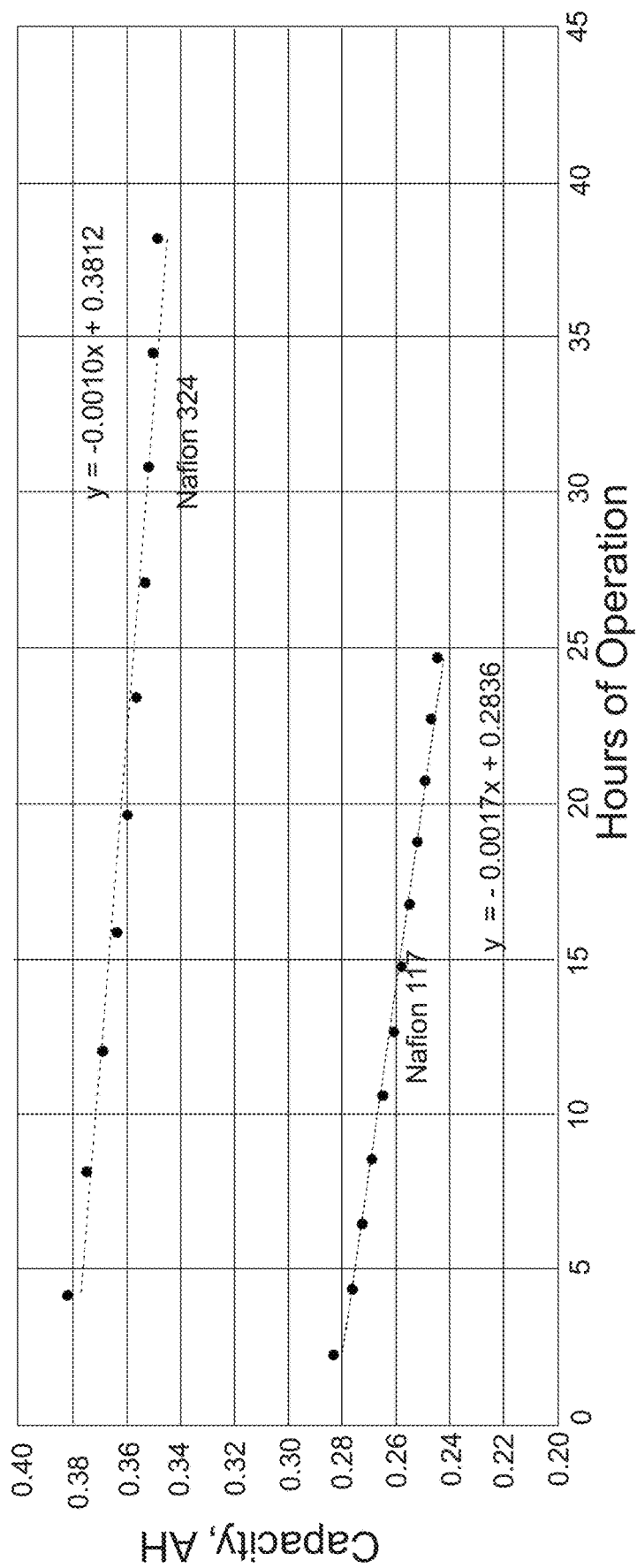
FIG. 10. Capacity fade of 0.1 DMDHMS/0.1M AQDS cell with NAFION® 117 and NAFION® 324 membranes.

In a variation, the reduced rate of crossover of the redox active molecules is achieved by using a membrane with a higher equivalent weight of NAFION®. The membrane NAFION® 324, has a 25-micron layer of equivalent weight 1500 and a 150-micron layer of equivalent weight 1100. The crossover rate of DMDHMS through such a membrane is just 0.65 of that through a homogenous NAFION® 117 membrane that has an equivalent weight of 1100 throughout the membrane. FIG. 10 shows the advantage of using the NAFION® 324 membrane over NAFION® 117 and benefit of tailoring the water content of the membrane to reduce the crossover rate and having a slower rate of decay of capacity.

Figure 11:
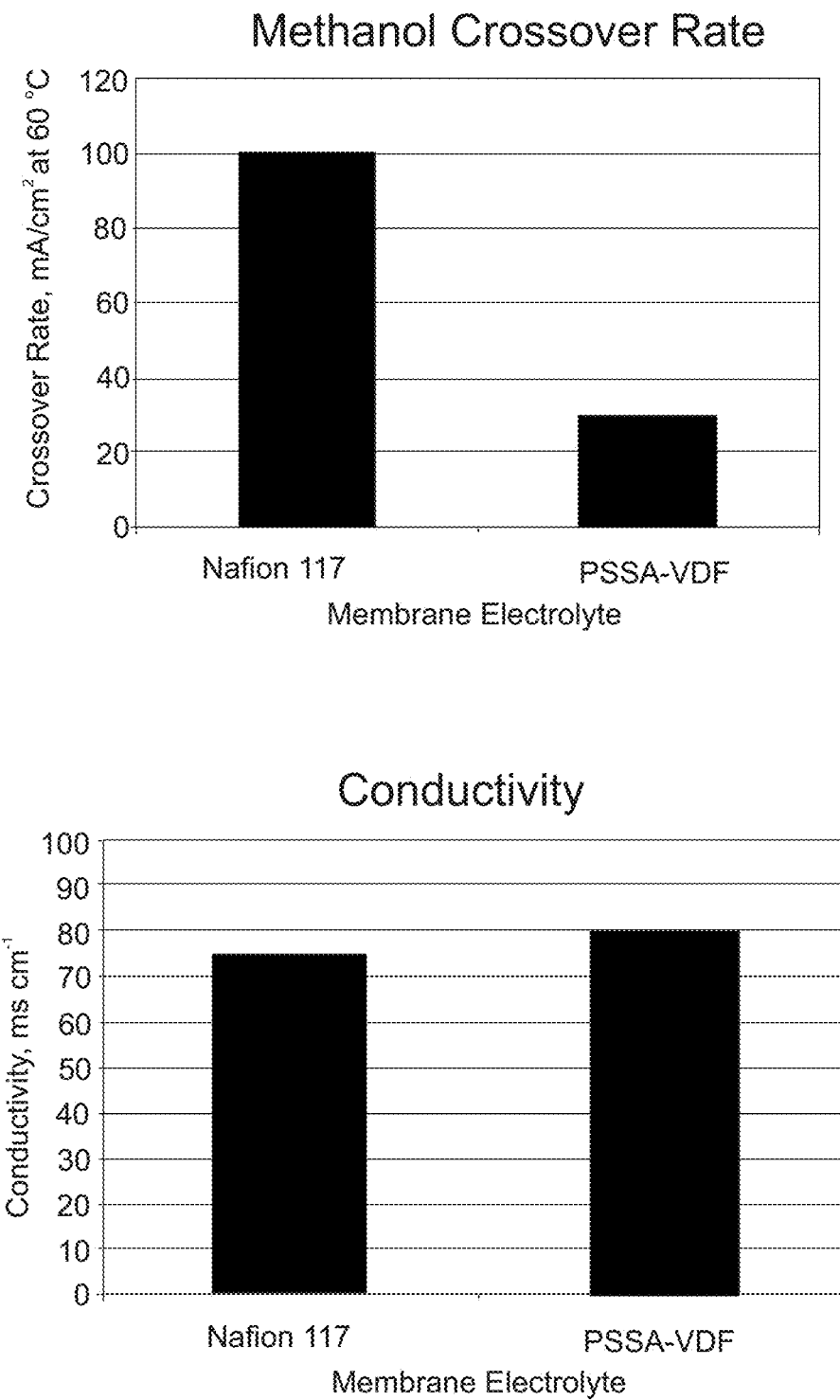
FIG. 11. Properties of PSSA-PVDF membranes with low water content and reduced rate of crossover.
Figure 12:
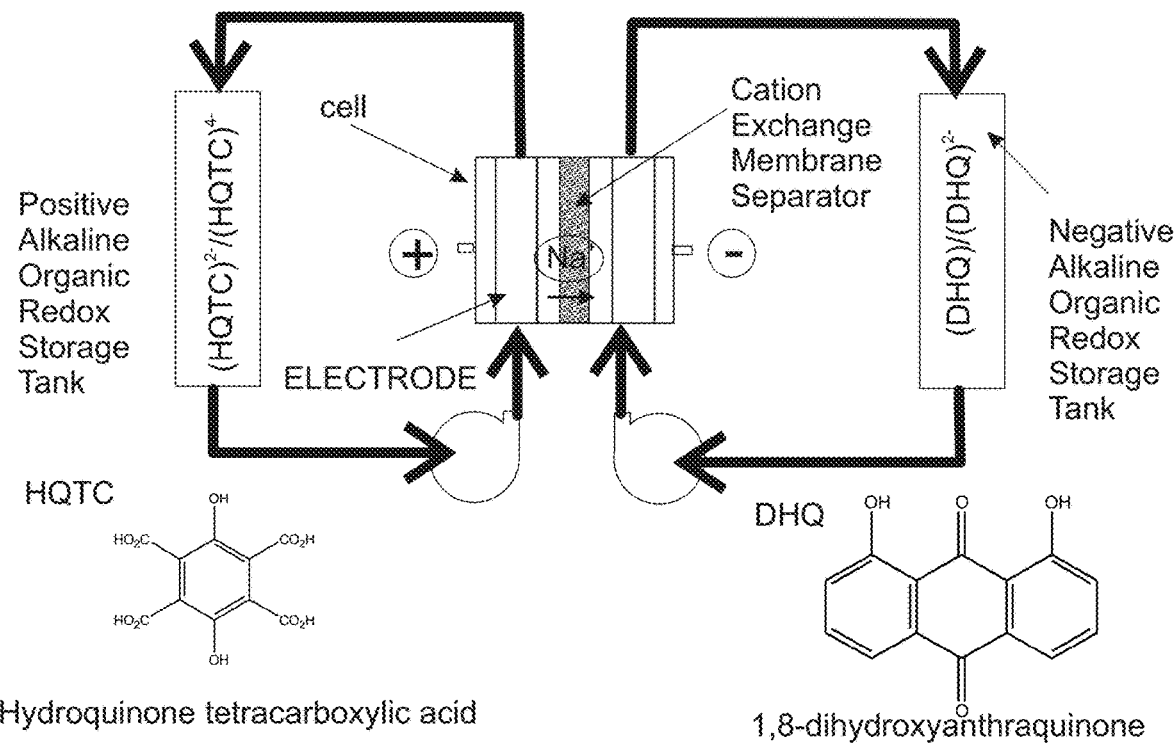
FIG. 12. Schematic of the Organic Redox Flow Battery with alkaline electrolyte.
Figure 13:
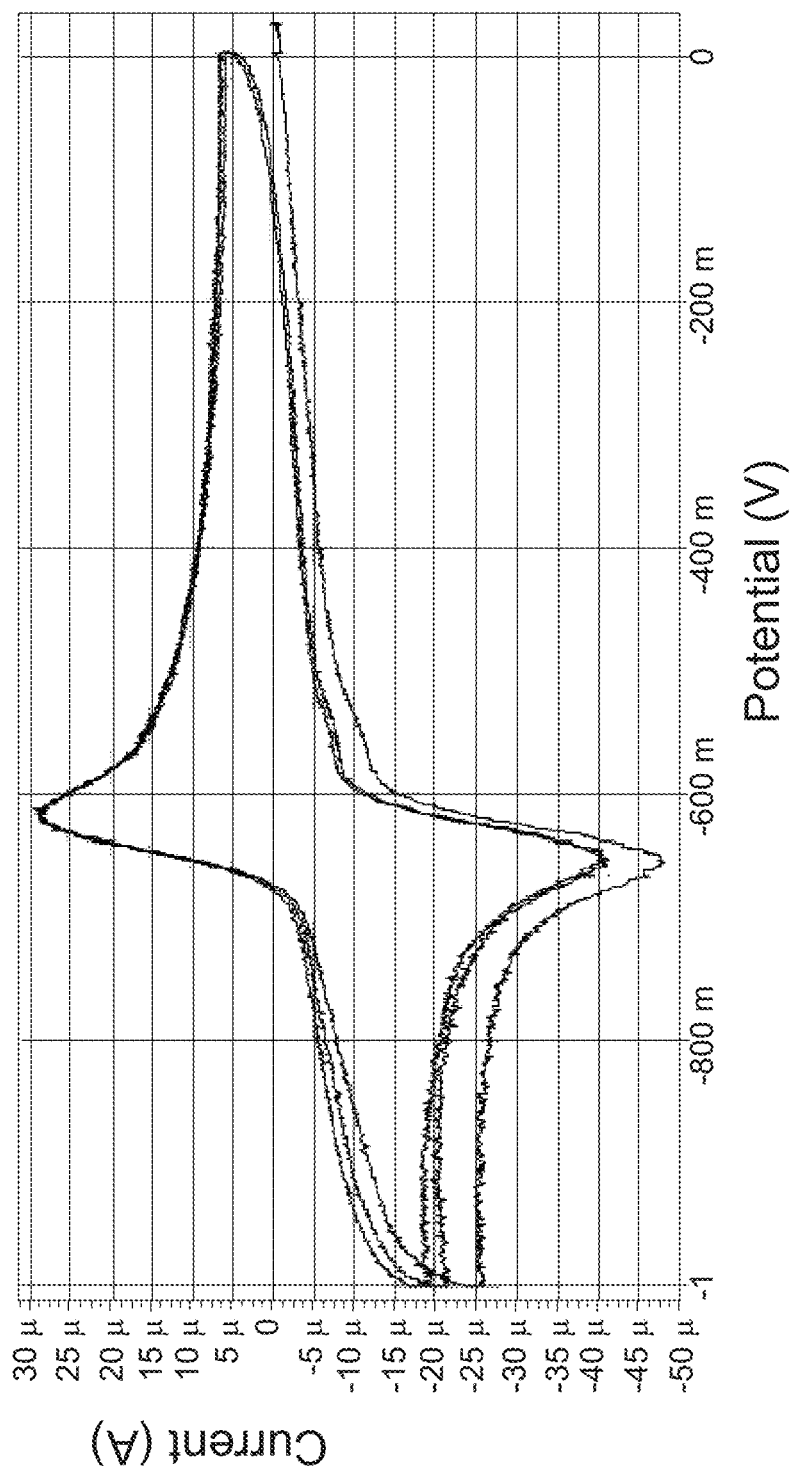
FIG. 13. Cyclic voltammogram of 0.001 M DHA in 1 M potassium hydroxide at a glassy carbon electrode.

Other membranes such as those fabricated from polystyrenesulfonic acid and polyvinylidene fluoride (PSSA-PVDF) that have low water content and have a low ionic cluster size and will be useful in suppressing crossover of the redox molecules. These membranes achieve low water content because of an interpenetrating network of formed by the polymers. Such PSSA-PVDF membranes have been fabricated and these membranes exhibit about 70% reduction in the crossover rate of methanol without compromise of ionic conductivity (FIG. 11). Therefore, we claim that redox flow batteries using PSSA-PVDF membranes and such other membranes of the interpenetrating type or of low water content are preferred improvements over the NAFION® 117 membrane. Similar membranes can be prepared from sulfonated polyethersulfone (PES) and sulfonate polyetheretherketone (PEEK).

Figure 17:
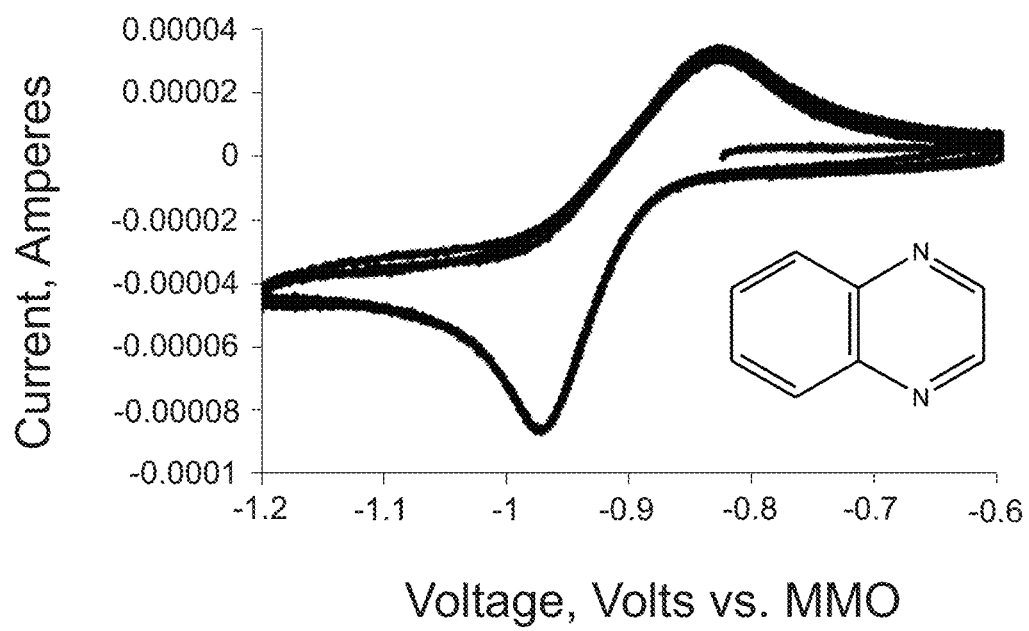
FIG. 17. Electrochemical behavior (a cyclic voltammogram) of quinoxaline in alkaline electrolyte (1 M potassium hydroxide).

In another embodiment, an organic redox flow battery using alkaline electrolytes is provided. The Organic Redox Flow Battery with Alkaline electrolyte (FIG. 17) consists of a cell in which the positive and negative electrode is separated by a cation exchange membrane (or ion conducting membrane). Such a membrane can conduct cations such as protons, sodium and potassium ions. Other cations such as cesium and lithium can also conduct across this membrane. The membrane serves to separate the positive and negative electrodes of the cell. An example of such a membrane is NAFION®, a DuPont product, consisting of a polymer made of perfluorohydrocarbonether sulfonic acid.

The electrodes in the cell are constructed of an electrically conductive, porous carbon structure made of either carbon paper or graphite felt or similar materials that are made from carbon and have the significant porosity to allow for the flow of aqueous solutions and sufficient conductivity to offer a low resistance for the flow of electrons. Electrode compartments separated by the membrane are assembled together using tie rods. Gaskets are used to prevent leakage of solutions to the outside of the cell. Current can be drawn from the cell through the electrical contacts on the outer surface of the electrode compartments.

Each of the electrode compartments has flow passages (also called flow fields) that allow the electrolyte to permeate the electrode structures. The electrolyte is alkaline and is typically sodium hydroxide or potassium hydroxide dissolved in water at concentrations ranging from 0.01 to 7 moles/liter.

The organic redox couples are dissolved in this alkaline electrolyte. The alkaline solution of two different kinds of redox couples are circulated past the electrodes. The redox couple with a more negative standard reduction potential functions as the negative electrode, while that with a more standard reduction potential serves as the positive electrode. Pumps are used to circulate the alkaline electrolyte through the cell.

Figure 18:
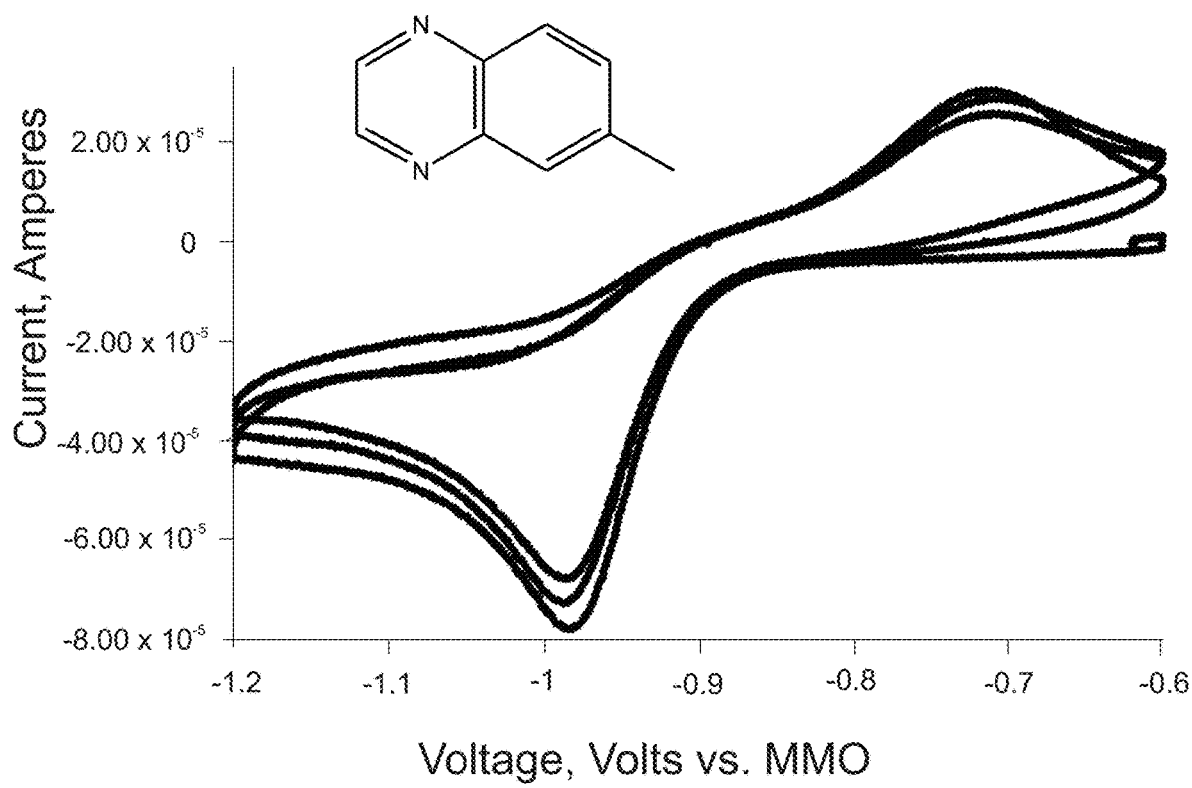
FIG. 18. Cyclic voltammogram of 6-methylquinoxaline in 1 M potassium hydroxide.

The redox couples must be soluble in the alkaline electrolyte and must can undergo facile electron transfer. For example, electrochemical studies on the molecule 1, 8-dihydroxyanthraquinone (DHA) dissolved in a 1 M solution of sodium hydroxide suggest a reversible electrochemical reaction of this redox couple (FIG. 18). The two symmetrical current peaks in the cyclic voltammogram indicate reversible electrochemical reactions of oxidation and reduction. The cyclic voltammogram indicates that the reduction potential for this redox couple is about −0.7 V vs. the mercury/mercuric oxide reference electrode. Based on these results, we may expect DHA with substituent groups such as additional hydroxyl groups or methyl, chloro, cyano or sulfonic acid groups to have the desired electrochemical characteristics for charge and discharge.

Figure 19:
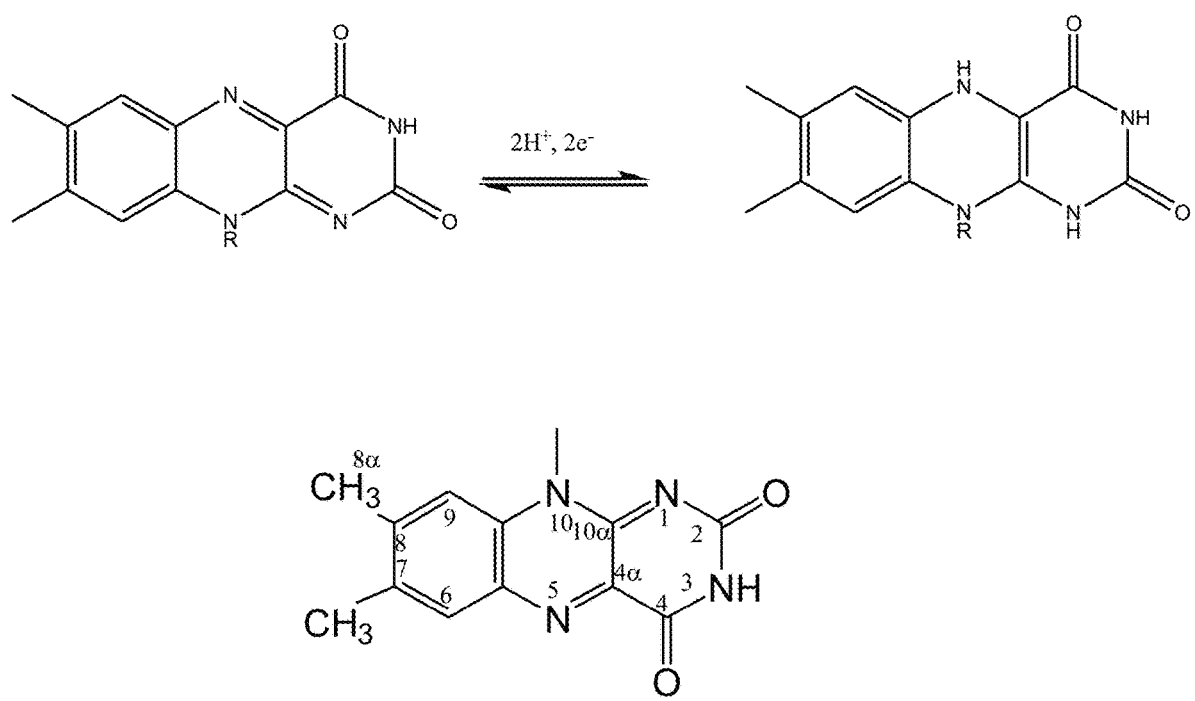
FIG. 19. Flavin group of compounds with various substituents for R=ribose.

Similarly, anthraquinone-2,6-disulfonic acid (AQDS) also exhibits reversible electrochemical behavior in an alkaline electrolyte of 1 M sodium hydroxide (FIG. 19). The reduction potential for this couple in alkaline electrolyte is about −0.35 V vs. MMO.

Figure 20:
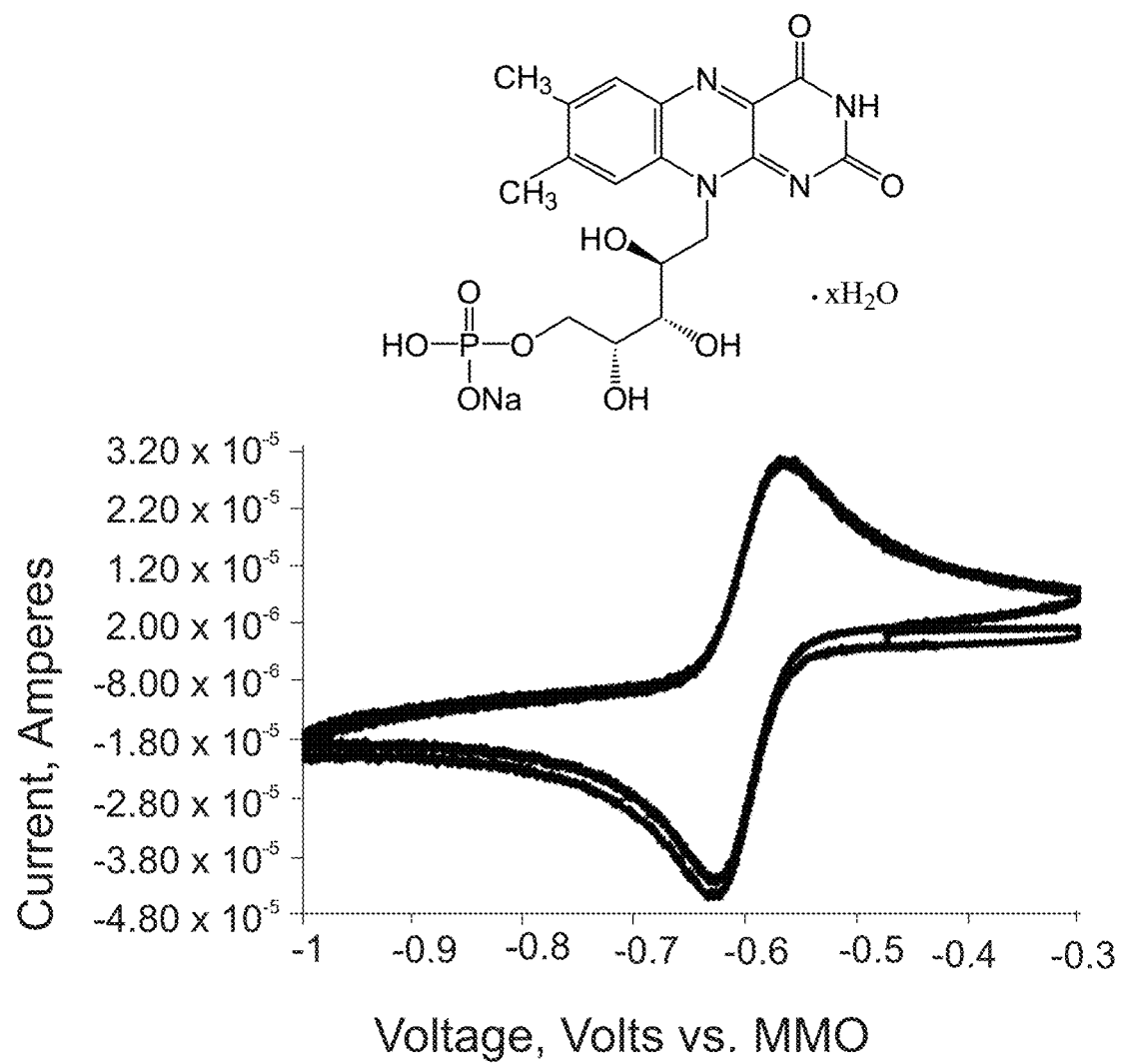
FIG. 20A. Cyclic voltammogram of riboflavin-5'-phosphate sodium hydrate in 1M potassium hydroxide.
FIG. 20B. Cyclic voltammogram of riboflavin in 1M potassium hydroxide.
Figure 20B:
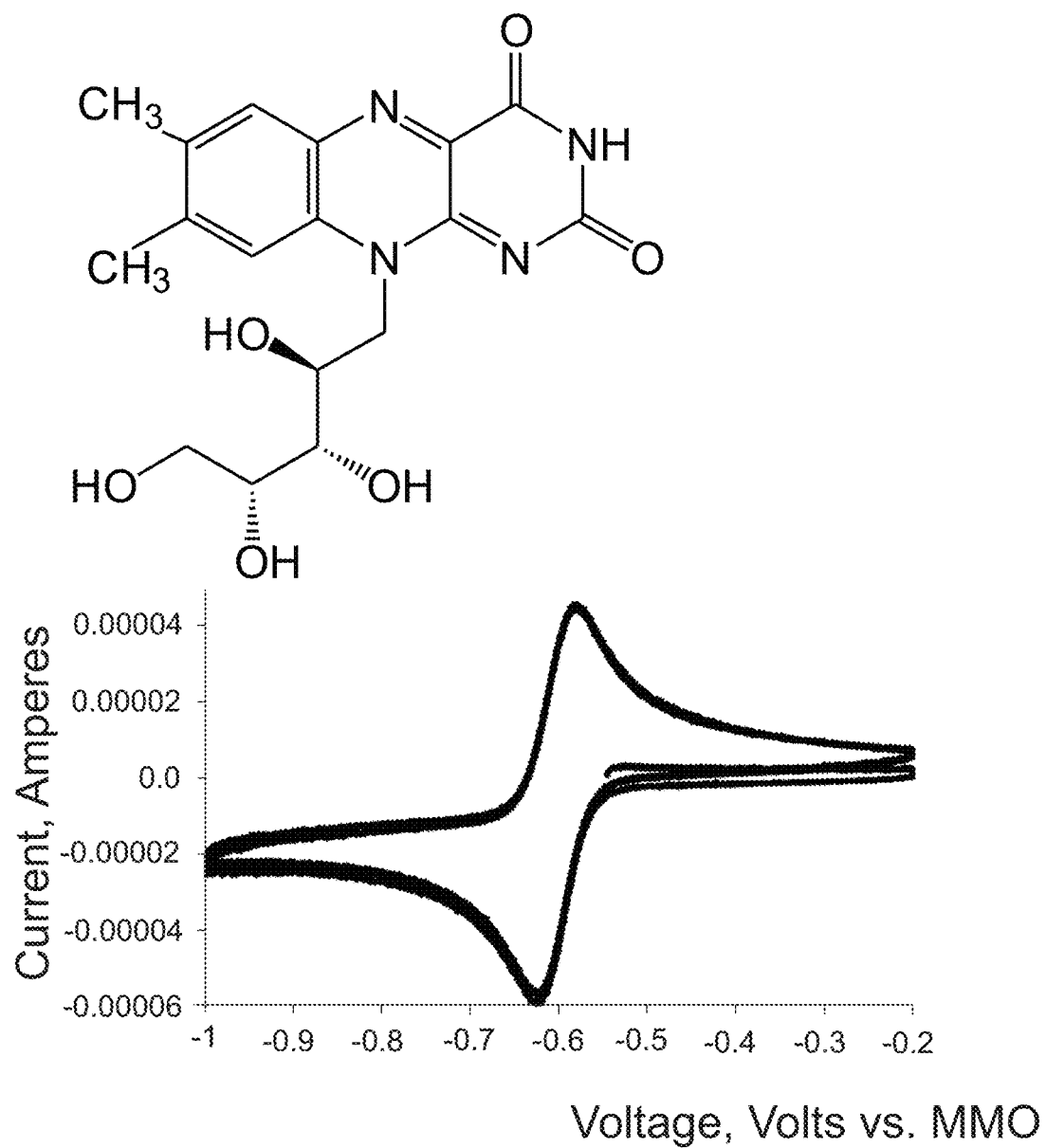

Based on the electrode potentials, the DHA can serve as the negative electrolyte and the AQDS can serve as the positive electrolyte. The cell constructed with these two redox couple-containing solutions circulated past the electrode was found to be capable of undergoing charge and discharge many times (FIG. 20). The cell was charged and discharged at 8 mA/cm$^2$. The value of cell voltage was consistent with that expected from the reduction potential of the redox couples. The expected value of cell voltage was the difference between the reduction potentials of −0.7 V and −0.35 V, which is 0.35 V. The discharge voltages were about 0.2 V and the charge voltages were about 0.4 V.

Figure 21:
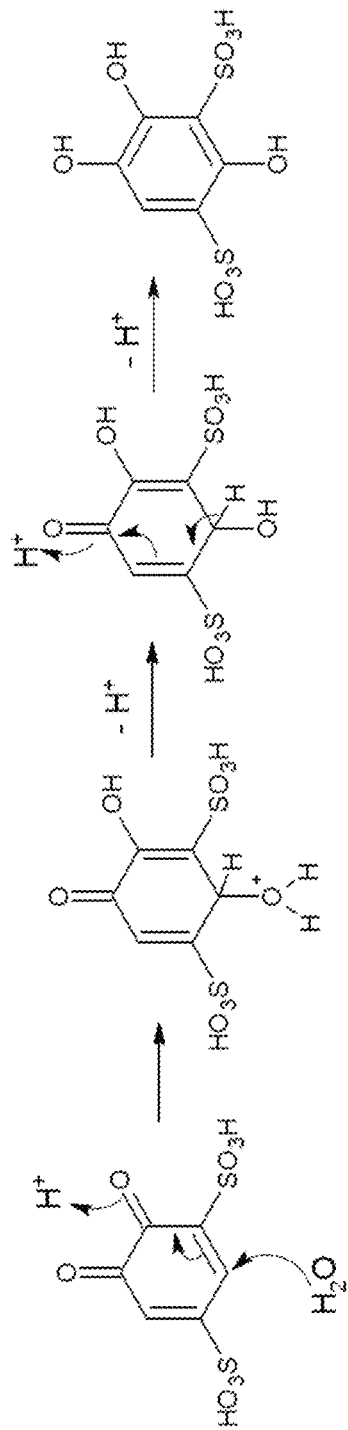
FIG. 21. Michael Reaction on Benzoquinonedisulfonic acid.

Similarly, hydroquinone sulfonic acid (HQS) could be used as a positive electrode redox couple and combined with DHA to form a redox flow battery. The performance of such a cell during charge and discharge is shown in FIG. 21.

While these compounds are not suitable for operation in acidic media because of the attendant polymerization reactions, these compounds perform well in alkaline media. The electrochemical behavior of quinoxaline is shown in FIG. 22. The symmetrical current peaks suggest reversible electrochemical behavior suitability for redox flow batteries. The reduction potentials are quite negative relative to the last example of DHA. Consequently, this may be combined with AQDS to form a redox flow battery.

Figure 23A:
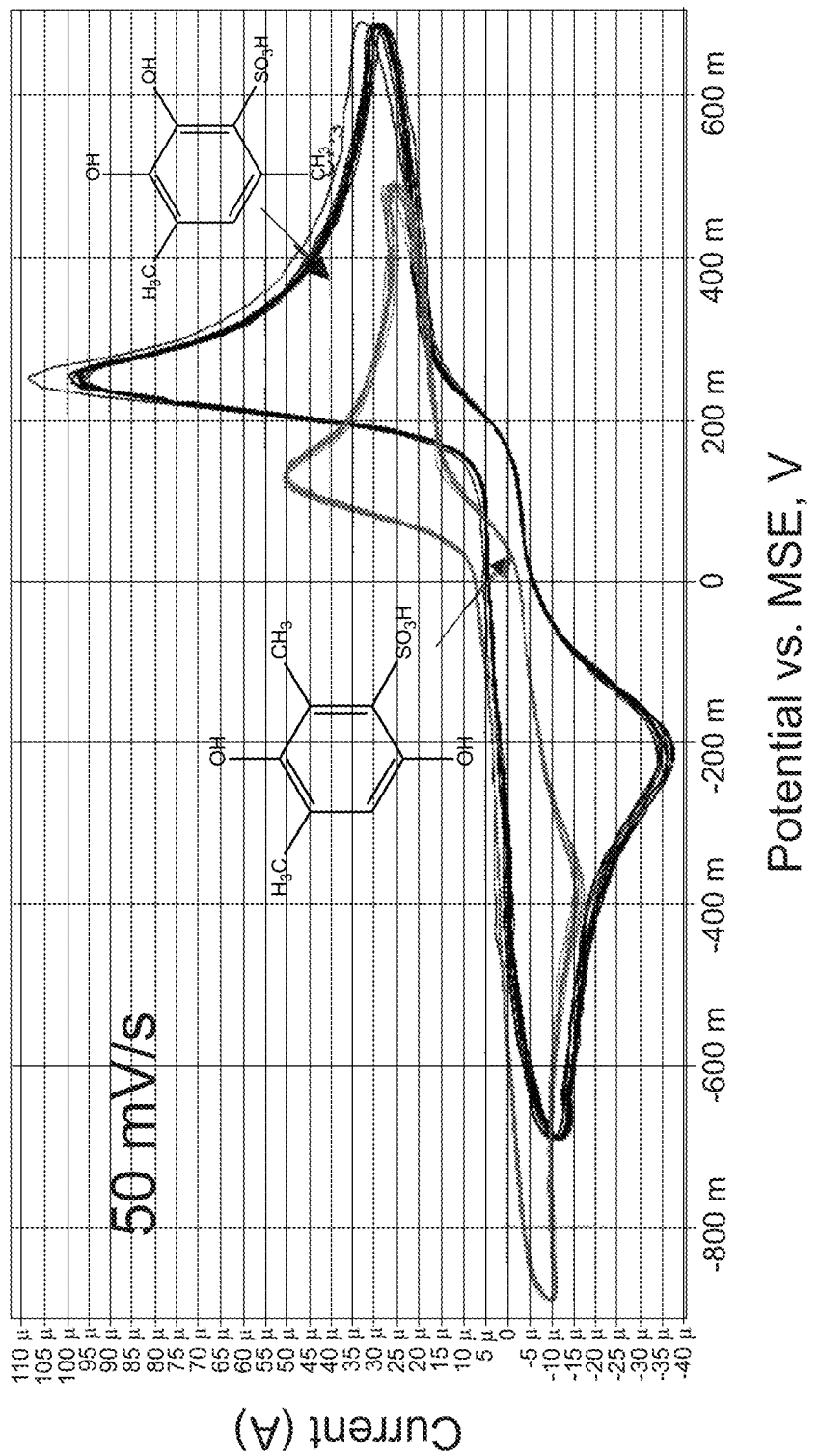
FIGS. 23A and 23B. Electrochemical properties of dimethyl substituted ortho and para-benzoquinone monosulfonic acid.
Figure 23B:
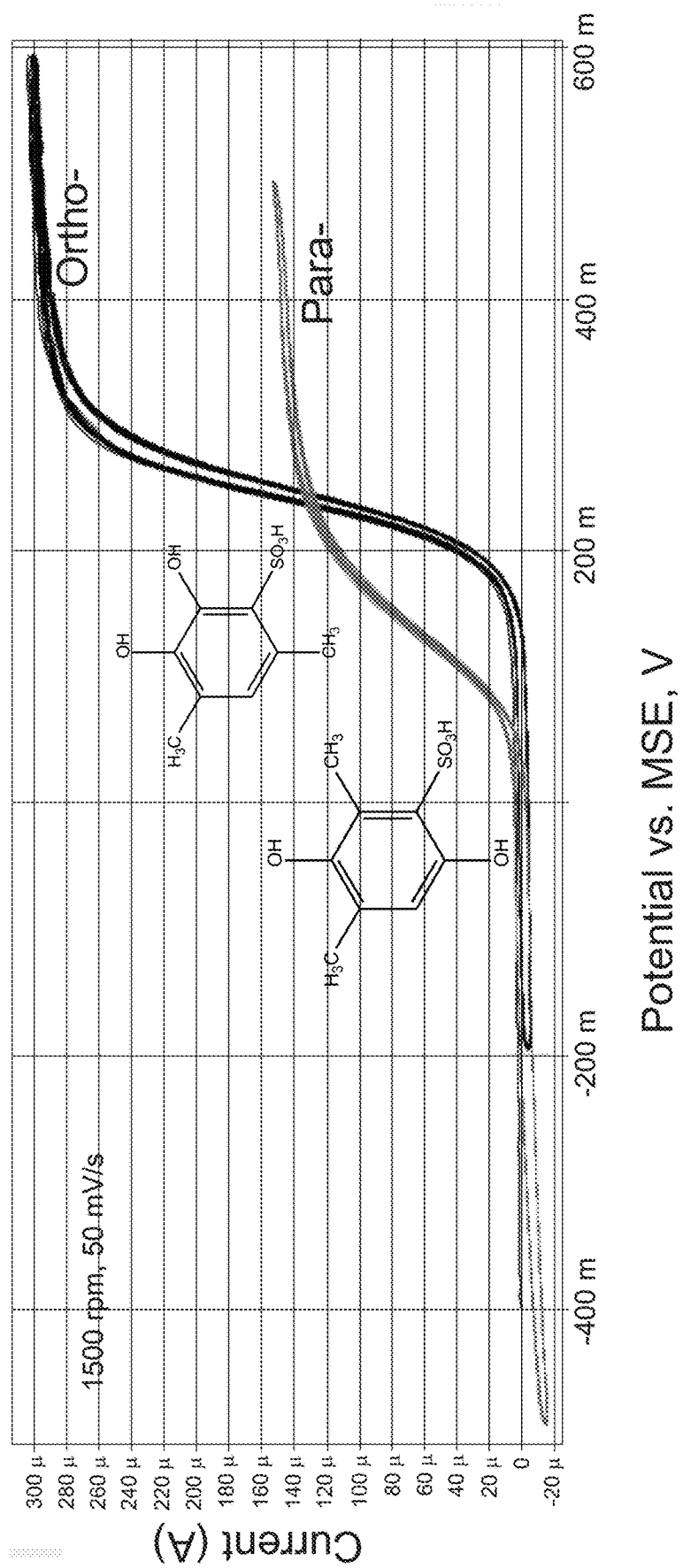

The electrochemical properties of a substituted quinoxaline in alkaline media that is suitable for redox flow battery operation is shown in FIG. 23.

In another embodiment, compounds for the first redox couple 22 and/or the second redox couple 32 of FIG. 1 flavins. The flavins refer to the family of compounds with the basic structure of the isoalloxazine ring system as in FIG. 24.

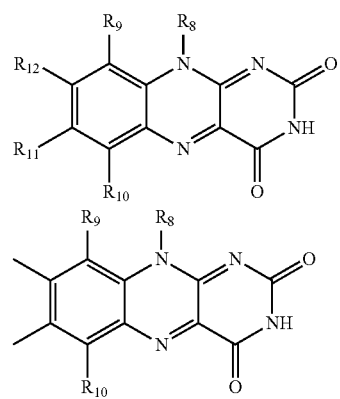

wherein:
$R_8$, $R_9$, $R_{10}$, $R_{11}$, $R_{12}$ are each independently H, $NH_2$, —NHR, —N(R)$_2$, —O$^-$M$^+$, —NHCOR, —OR, —CH$_3$, —$C_2H_5$, —$SO_3H$, —$PO_3H_2$, —COOH, —OH, —$N(R)_3^+$ $X^-$, —$CF_3$, $CCl_3$, —CN, —COOR, F, Cl, Br, —CHO, —COR—$O^-M^+$, —$SO_3^-M^+$, —$PO_3^{2-}M^+_2$, —$COO^-M^+$, pyridinyl, imidazoyl, pyrroyl, or phenyl where R is H or $C_{1-10}$ alkyl and $M^+$ is a positively charged counter.

In one refinement, at least one of $R_5$, $R_9$, $R_{10}$, $R_{11}$, $R_{12}$ is an electron withdrawing group that can increase the reduction potential of the compound having the group. In a further refinement, 1, 2, 3, 4, or 5 of $R_5$, $R_9$, $R_{10}$, $R_{11}$, $R_{12}$ are electron withdrawing groups. Examples of such electron withdrawing groups include but are not limited to, —$NO_2$, —$N(R)_3^+X^-$, —$CF_3$, $CCl_3$, —CN, —$SO_3H$, —$PO_3H_2$, —COOH, —OH, —$O^-M^+$, —$SO_3^-M^+$, —$PO_3^{2-}M^+_2$, —$COO^-M^+$, —COOR, F, Cl, Br, —CHO, —COR where R is H or $C_{1-10}$ alkyl, $M^+$ is a positively charged counter-ion (e.g., $Na^+$, $K^+$, and the like). As described herein, when electron withdrawing groups are used as substituents for organic compounds in the negative electrode electrolyte such groups can provide further separation from the reduction potential of the positive electrode electrolyte. In one refinement, at least one of $R_5$, $R_9$, $R_{10}$, $R_{11}$, $R_{12}$ is an electron donating group that can decrease the reduction potential. In a further refinement, 1, 2, 3, 4, or 5 of $R_5$, $R_9$, $R_{10}$, $R_{11}$, $R_{12}$ are electron donating groups. Examples of such electron donating groups include but are not limited to, $C_{1-10}$ alkyl, $NH_2$, —NHR, —$N(R)_2$, —$O^-M^+$, —NHCOR, —OR, —$CH_3$, —$C_2H_5$, or phenyl where R is H or $C_{1-10}$ alkyl and $M^+$ is a positively charged counter-ion (e.g., $Na^+$, $K^+$, or the like). As described herein, when electron donating groups are used as substituents for organic compounds in the positive electrode electrolyte such groups can provide further separation from the reduction potential of the negative electrode electrolyte. In still another refinement, at least one of $R_5$, $R_9$, $R_{10}$, $R_{11}$, $R_{12}$ is a functional group that increases water solubility. In a further refinement, 1, 2, 3, 4, or 5 of $R_5$, $R_9$, $R_{10}$, $R_{11}$, $R_{12}$ are such functional groups. Examples of such functional groups include, but are not limited to, —$SO_3H$, —$PO_3H_2$, —COOH, —OH, —$O^-M^+$, —$SO_3^-M^+$, —$PO_3^{2-}M^+_2$, —$COO^-M+$, pyridinyl, imidazoyl, and pyrroyl, where $M^+$ is a positively charged counter-ion (e.g., $Na^+$, $K^+$, and the like). This family of compounds is also suitable for use in alkaline media as a redox flow battery electrolyte. Substitutions at positions 6, 9 and 10 are useful in changing the reduction potential of the redox couples. The behavior of two types of flavins is shown in FIGS. 25A and 25B.

In another embodiment, deterioration of redox flow batteries by the Michael's Reaction is mitigated. Redox flow batteries that use organic molecules with a propensity to undergo the Michael reaction and transform during cycling. These transformations involve electrochemical oxidation of the hydroxyl group to the quinone, followed by the addition of water to form reduced products. The addition of nucleophiles such as water to the α, β-unsaturated carbonyl compounds in a 1,4-fashion is called the Michael reaction which can be acid or base catalyzed. The nucleophilic addition of water is accompanied by re-aromatization and exchange of the proton as depicted by the acid catalyzed reaction of FIG. 21. The Michael reaction necessitates additional charge input for the re-oxidation of the product during charging. The flow battery of this embodiment includes a positive electrode, a positive electrode electrolyte, negative electrode, and a negative electrode electrolyte. The positive electrode electrolyte includes water and a first redox couple. The positive electrode electrolyte flows over and contacts the positive electrode. Characteristically, the first redox couple includes a first organic compound and a reduction product of the first organic compound where the first organic compound is reduced during discharge. The negative electrode electrolyte includes water and a second redox couple. The negative electrode electrolyte flows over and contacts the positive electrode. Characteristically, the second redox couple also includes a second organic compound. A reduction product of the second organic compound is oxidized to the second organic compound during discharge. One or both of the first organic compound and the second organic compound include a compound selected from the group consisting of:

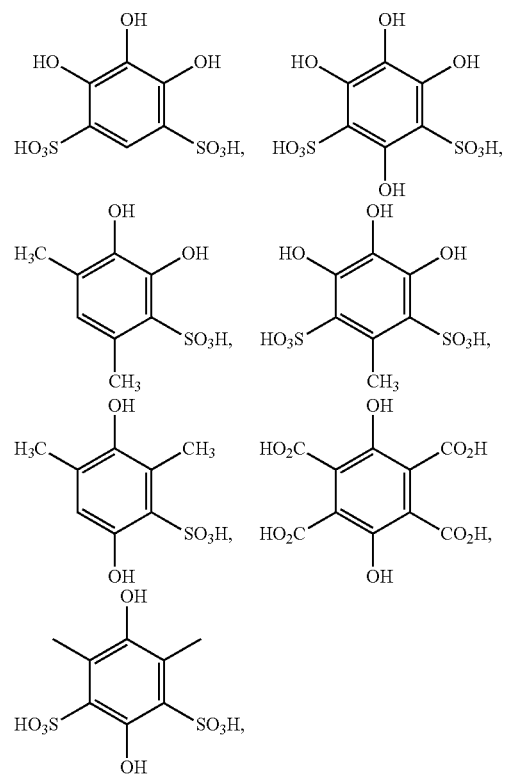

and combinations thereof.

Figure 24:
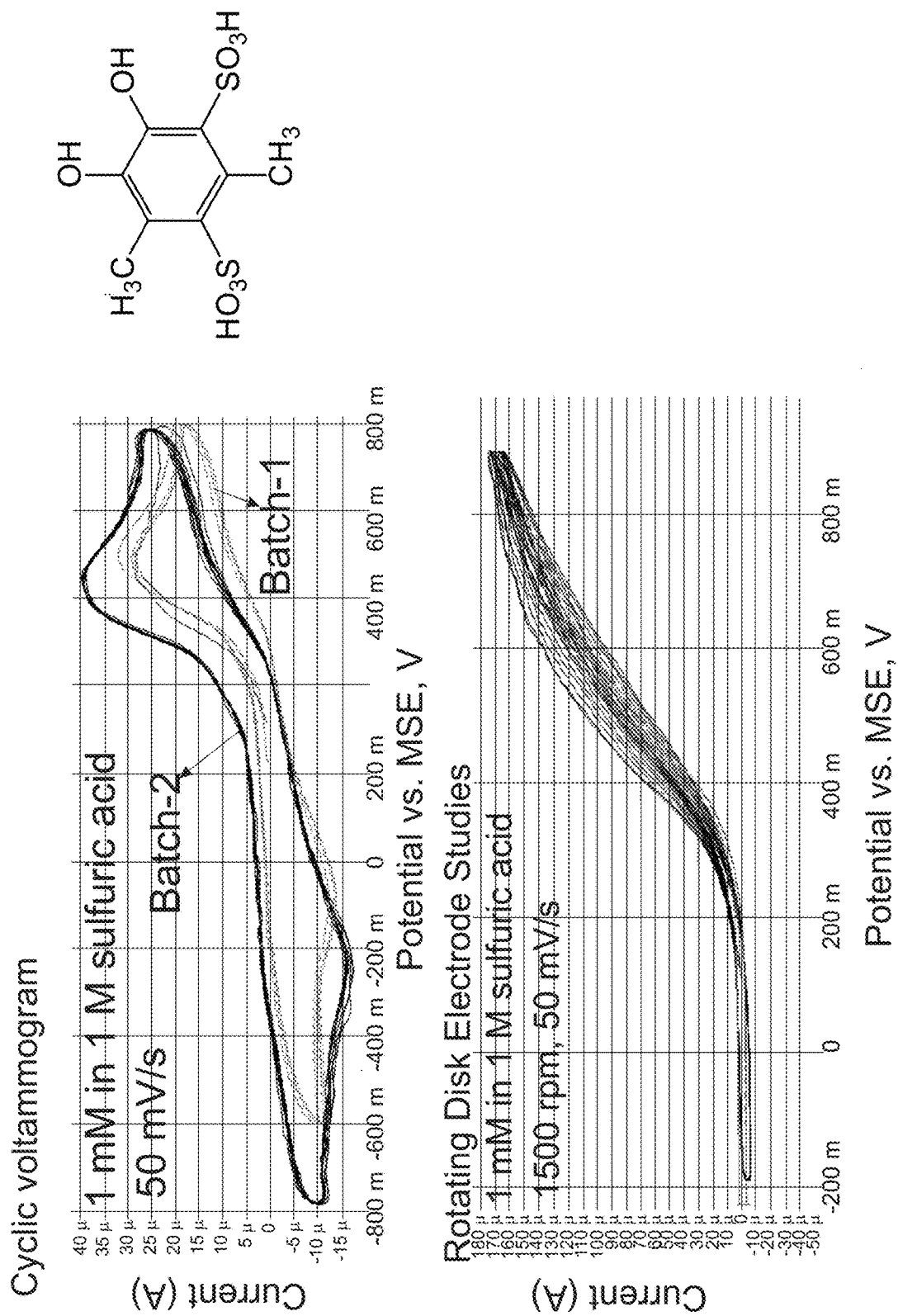
FIG. 24. Electrochemical Properties of dimethyldihydroxybenzene disulfonic acid.

The Michael reaction does not occur with these molecules because the aromatic ring is fully substituted or the nucleophilic attack of the open positions on the ring is sterically hindered. These molecules are claimed to provide an improved performance through resistance to degradation during cycling. We have measured the electrochemical properties of several of these substituted molecules are shown in FIG. 22. Cyclic voltammetry and studies using the rotating disk electrode confirm the redox activity and the reversibility of these molecules that are resistant to the Michael reaction. The results of the electrochemical studies are shown in FIGS. 23, 24 and 25.

Figure 14:
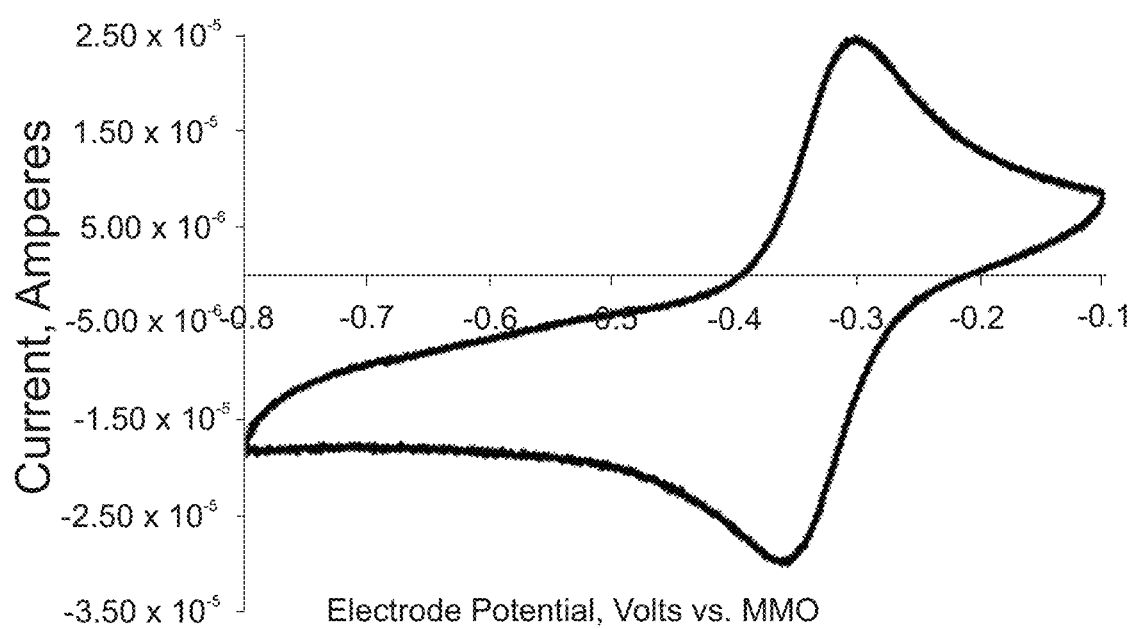
FIG. 14. Cyclic voltammogram of 0.001 M AQDS in 1M potassium hydroxide.
Figure 15:
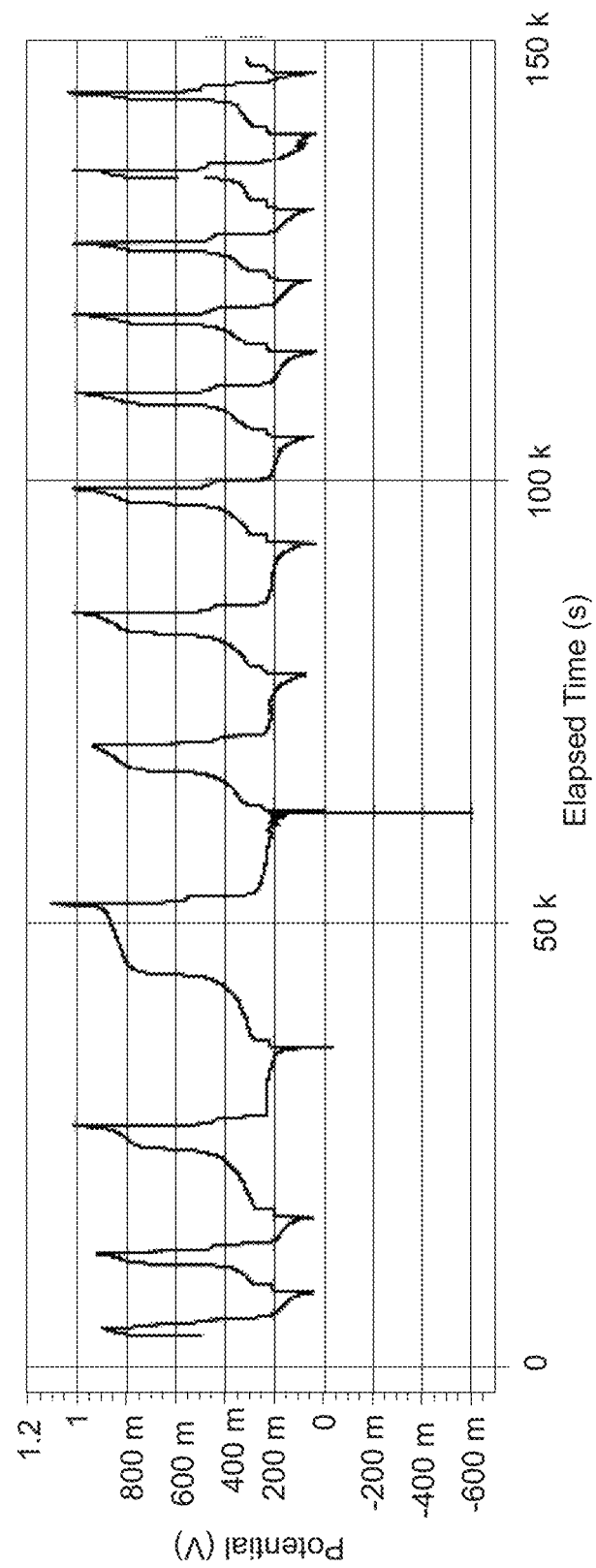
FIG. 15. Cycling experiment of organic redox flow battery using alkaline solutions of 0.2M DHA, 0.2M AQDSH in 1M NaOH charged and discharged at 8 mA/cm2.
Figure 16:
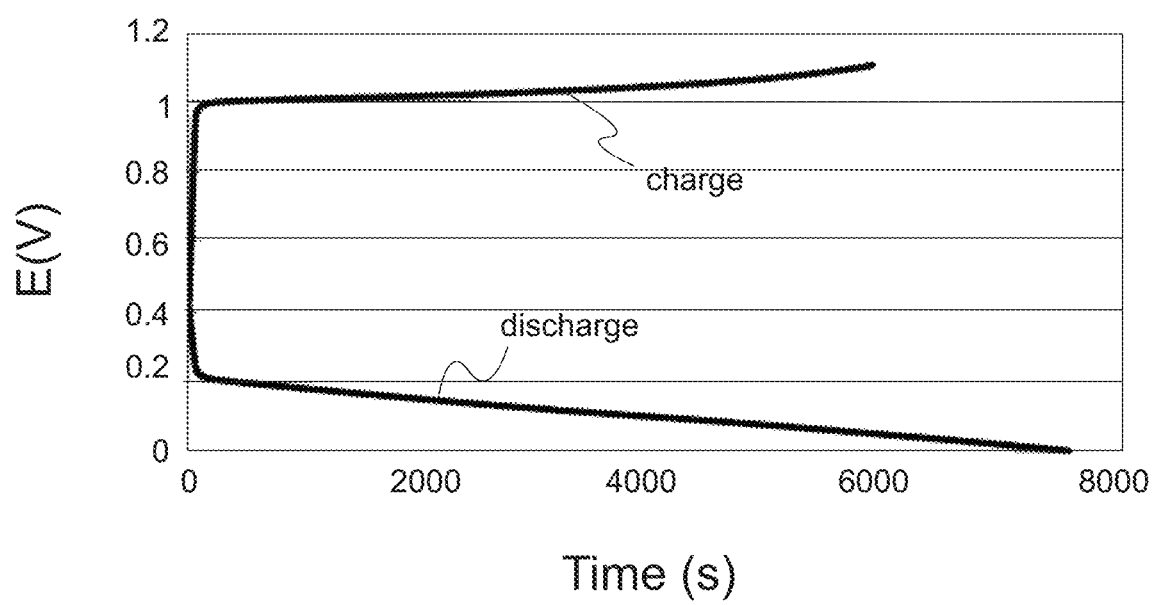
FIG. 16. Performance of HQS/DHA cell using alkaline electrolyte charged at 200 mA and discharged at 50 mA.

The resistance of the materials to undergo the Michael reaction has been demonstrated by the cycling properties of organic redox flow cells that use these substituted molecules. In FIG. 25 we show the charge and discharge curves for a cell using 2,5-dimethyl-1,4-dihydroxybenzene-3-sulfonic acid and anthraquinone-2,7-disulfonic acid. The charge and discharge curves for this cell showed a single plateau confirming just one reaction at the positive and negative electrodes (FIG. 25). If the Michael reaction occurred, then there would be multiple plateaus corresponding to multiple redox reactions that accompany the sequential hydroxylation and aromatization processes of the Michael reaction. The charging process required only a stoichiometric amount of anthraquinone-2,7-disulfonic acid further confirming that the Michael reaction did not occur. The resistance to Michael reaction continues through at least 100 cycles of charge and discharge (FIG. 25). Therefore, substituted molecules such as the ones shown in FIGS. 14, 15 and 25 are claimed to improve the performance of the aqueous organic redox flow battery.

Figure 26:
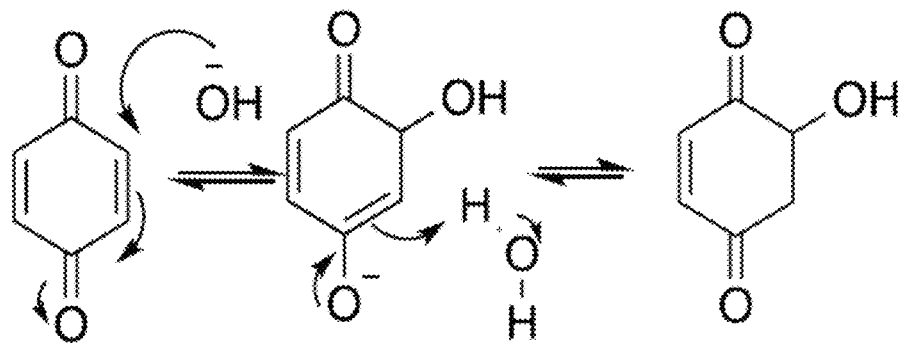
FIG. 26. Mechanism of the Michael Addition reaction.
Figure 28:
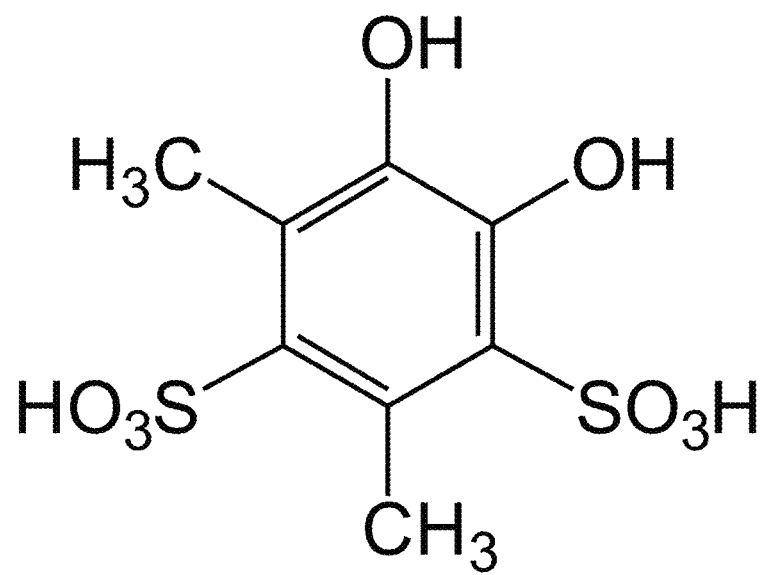
FIG. 28. Benzene 1,2-dihydroxy-4,6-dimethyl-3,5-disulfonic acid Example of substituted compound with multiple functional groups that can resist Michael Addition reaction.

Redox molecules that are suitable for operation in alkaline media have a structure that is not prone to the Michael addition reaction. The Michael addition reaction is also called nucleophilic 1,4 addition. This reaction leads to formation of hydroxylated products (FIG. 26). Compounds that have the $\alpha,\beta$-unsaturated carbonyl structure with an open position for attack by the hydroxyl as shown in FIG. 26, will not be stable in acidic, neutral or alkaline media. While this reaction is not rapid in acidic media, it occurs far more readily in alkaline media. The reactions can occur sequentially on the hydroxylated products until no more positions are available for Michael addition. This type of reaction is undesirable as it leads to an irreversible transformation of the redox couples. Therefore, designing molecules that are robust to the Michael addition reaction is necessary. The compounds set forth in FIG. 27 with substituents in the 4-position relative to the carbonyl group resist Michael addition. All positions that are prone to the Michael addition reaction are substituted in the compounds shown in FIG. 27. These compounds are representative of the quinone family. The principle can be extended to other functional groups such as sulfonic acids, phosphonic acids, chloro, fluoro, bromo, hydroxyl, alkoxy, amino, amido, and alkyl substituents. An example of a compound of this type with different functional groups is benzene 1,2-dihydroxy-4,6-dimethyl-3,5-disulfonic acid as shown in structure in FIG. 28.

Figure 29:
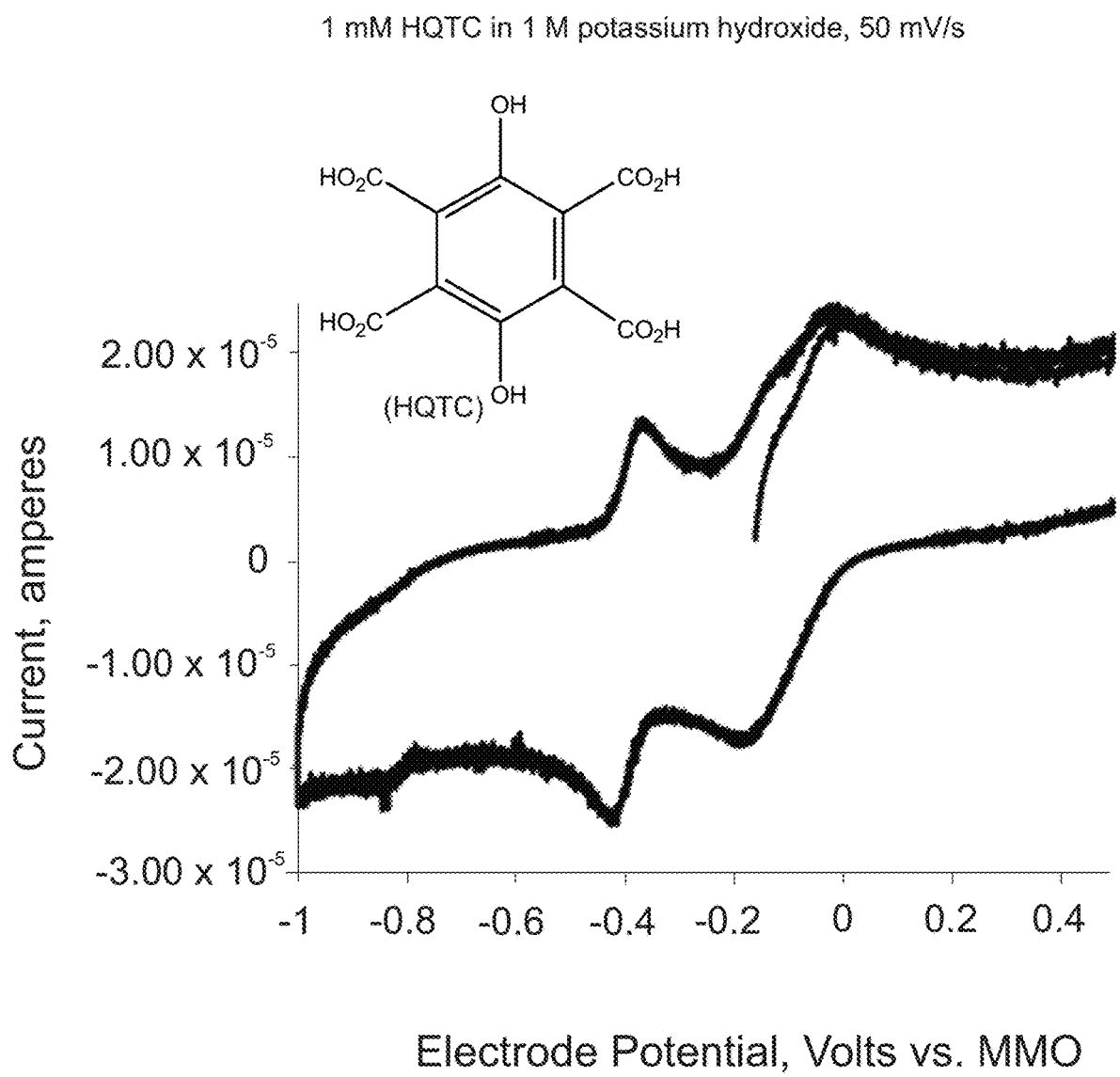
FIG. 29. Electrochemical behavior of HQTC in 1 M potassium hydroxide.
Figure 30:
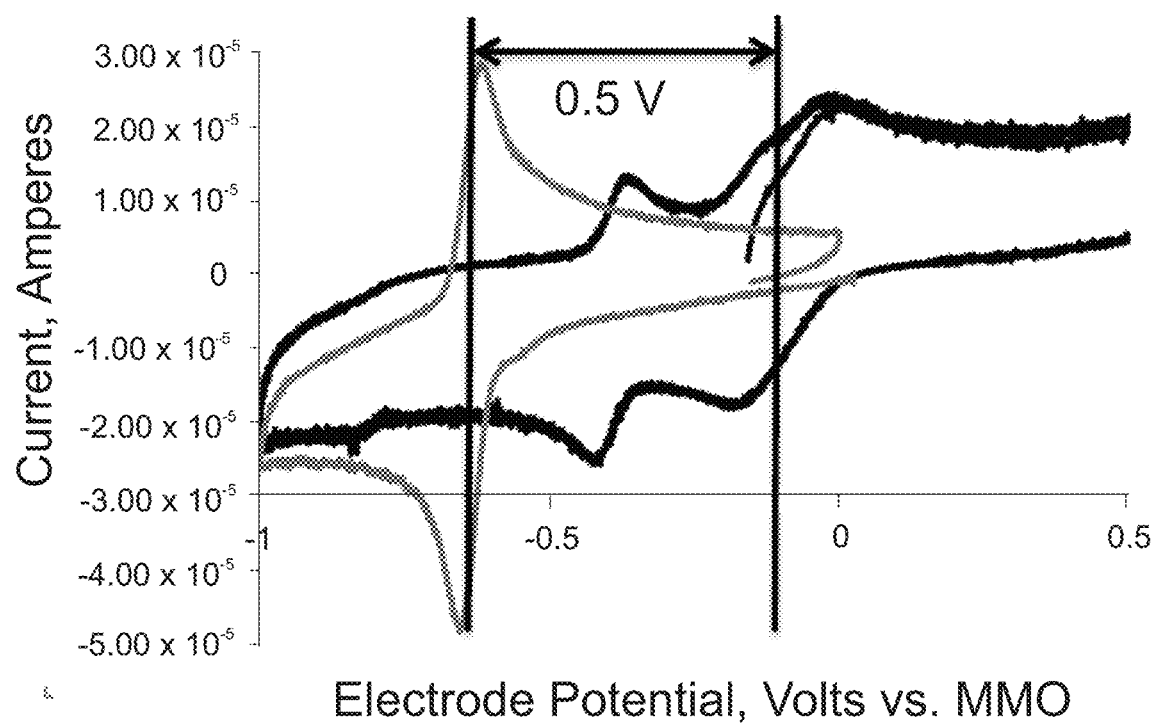
FIG. 30. The electrochemical behavior of HQTC and DHA in 1 M potassium hydroxide showing the cell voltage that can be realized from this type of redox flow battery.
Figure 31:
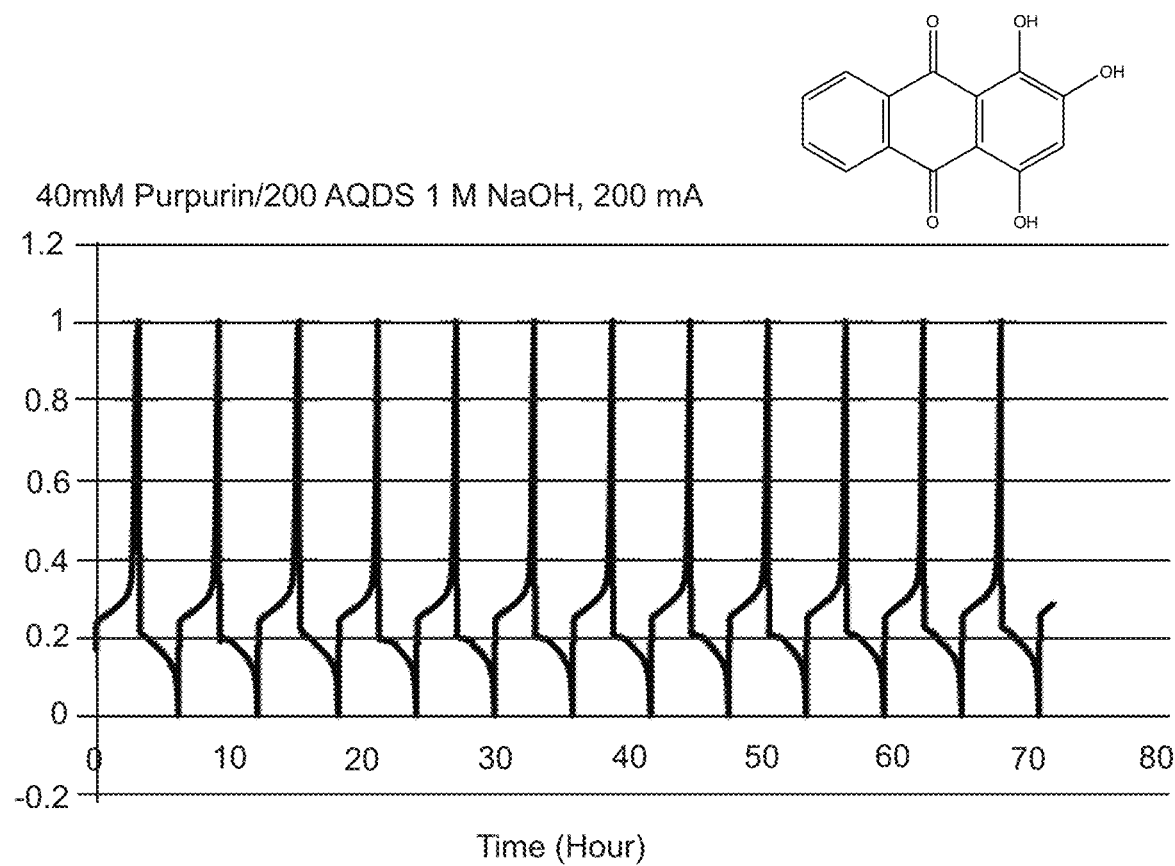
FIG. 31. Cycling of purpurin-AQDS cell in alkaline electrolyte.

The electrochemical reversibility of such a Michael addition-resistant compound is shown in FIG. 29 for benzenedihydroxy tetracarboxylic acid also called hydroquinonetetracarboxylic acid (HQTC). This compound shows reversible electrochemical behavior with two different sets of peaks corresponding to two steps of one-electron and one proton transfer processes. The reduction potential of HQTC is such that it can be combined with DHA to create a redox flow battery with a cell voltage of 0.5 V (FIG. 30). Further HQTC can also be combined with the molecules from the quinoxaline family, and the flavin family to yield redox flow batteries with the cell voltage in the range of 0.5 to 1 V. 1,2,4-trihydroxyanthraquinone (Purpurin) is claimed to be a negative electrode material suitable for operation in alkaline media. A cell constructed with purpurin as the negative electrolyte and AQDS as the positive electrolyte was found to cycle in a stable manner for over 70 hours without any noticeable change in capacity (FIG. 31).

A stack of cells that is used for such a redox flow battery that uses alkaline electrolytes set forth above can be fabricated from inexpensive materials such as stainless steel and nickel plated mild steel. Unlike the acid systems, the dissolution of metals is not a principal concern in alkaline media. Thus, metals such as nickel-plated steel or stainless steel can be are inexpensively stamped into bipolar plates to form the repeating element of the stack. The electrode structures do now have to be made of graphite, and the expensive felt electrodes may be replaced by porous metallic structures considerably reducing the cost of the stack.

In another variation, electrodes using nano-structured materials are provided. Advantageously, this variation can be deployed in each of the flow batteries described herein. Electrodes modified with carbon nano-structured materials on graphite felt are claimed to have improvement over conventional graphite felt structures. With these nano-carbon-coated electrode structures we can obtain high limiting currents and lower mass transport polarization. Consequently, the efficiency of the redox flow battery can be improved. Such electrode structures are fabricated by immersing the graphite felt electrode such as the ones made by SGL in a suspension of multi-walled carbon nanotubes (MWCNT). The suspension of MWCNT is made in a dilute solution of NAFION®, typically containing 5% by weight of the solution in isopropanol/water mixture. After immersing the graphite felt in the NAFION® solution, the felt is dried in an air oven at 125° C. for an hour. This treatment allows the NAFION® ionomer to bond the MWCNT with the graphite felt and also cause a phase inversion of the perfluorinated ionomer chains. The process of immersion and drying is repeated at least three times so that the required loading in the range of 10 to 30% is achieved. Higher loadings of MWCNT will block the pores of the graphite felt and thus impede fluid transport.

Examples of such MWCNT treated electrode structures were prepared and their surface area was measured using impedance spectroscopy. The electrochemically active surface area of the electrode with a geometric surface area was maximum with the 15% MWCNT containing felt (Table 4). The area enhancement was about 100 times.

TABLE 4

Electrochemically Active surface area of graphite felt (geometric surface area 25 $cm_2$) resulting from various modifications. Effect of Electrode Modifications on Active Area Measured from Double Layer Capacitance

| Modification Method | Surface Area (sq. cm) |
|---|---|
| Plain Felt | 122.0 |
| NAFION ® | 141.8 |
| Carbon 30% | 1694.9 |
| 15% CNT | 2222.2 |
| Heat Treated Felt | 1337.8 |

Figure 32:
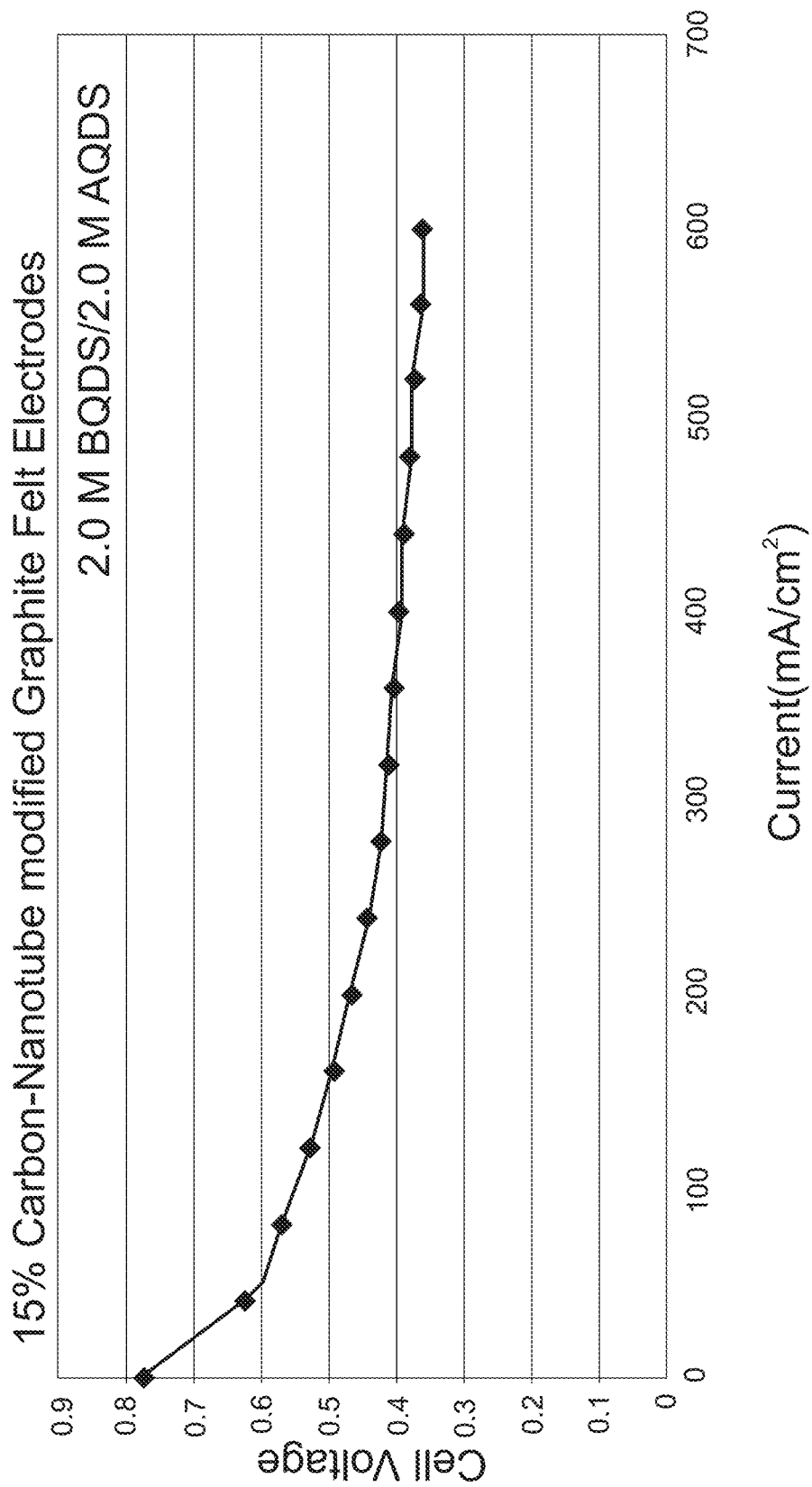
FIG. 32. Performance of aqueous organic redox flow battery with carbon-nanotube modified electrodes.

As a consequence of the enhancement in electrochemical active surface area with the carbon nanotube modified electrodes, the current density for the redox flow cell could be increased all the way to 600 mA/cm$^2$ (FIG. 32).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A flow battery comprising:
   a positive electrode;
   a positive electrode electrolyte including water and a first redox couple, the positive electrode electrolyte flowing over and contacting the positive electrode, the first redox couple including an organic compound having formula I and a reduction product of the organic compound, the organic compound having formula I being reduced during discharge:

a negative electrode; and a negative electrode electrolyte including water and a second redox couple, the negative electrode electrolyte flowing over and contacting the positive electrode, the second redox couple also includes the organic compound having formula I, the reduction product of the organic compound having formula I being oxidized during discharge:

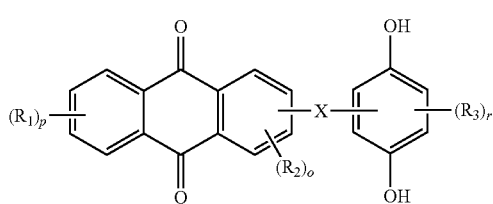

I wherein:
p is 0, 1, 2, 3, or 4;
o is 0, 1, 2, or 3;
r is 0, 1, 2, or 3;
$R_1$ and $R_2$ are each independently —$SO_3H$, —$SO_3Na$, —$SO_3K$, —$CO_2H$, —OH, —$OCH_3$, $C_{1-10}$ alkyl, —$(CH_2CH_2O)_nOCH_3$, —$NH_2$, $N(CH_3)_2$, —I, —Cl, —Br, —F, —$CF_3$, —$CF_2H$, —$NO_2$, —$CCl_3$, —CN, —$PO_3H_2$, —$PO_3^{2-}M^+_2$, —$COO^-M^+$, —COOR, —CHO, —$O^-M^+$, —NHR, —$N(R)_2$, —NHCOR, —OR, phenyl, —COR, $C_{6-10}$ aryl, pyridinyl, imidazoyl, or pyrroyl,
$R_3$ is —$SO_3H$, —$SO_3Na$, —$SO_3K$, —$CO_2H$, —OH, —$OCH_3$, $C_{1-10}$ alkyl, —$(CH_2CH_2O)_nOCH_3$, —$NH_2$, —$N(CH_3)_2$, —I, —Cl, —Br, —F, —$CF_3$, —$CF_2H$, —$NO_2$, —$CCl_3$, —CN, —$PO_3H_2$, —$PO_3^{2-}M^+_2$, —$COO^-M^+$, —COOR, —CHO, —$O^-M^+$, —COR, $C_{6-10}$ aryl, pyridinyl, imidazoyl, or pyrroyl;
R is H or $C_{1-10}$ alkyl;
$M^+$ is $Na^+$ or $K^+$;
X is —$(CH_2)_n$—, —$(CH_2OCH_2)_n$, $C_{4-15}$ branched alkyl chains or other substituted alkyl chains; and
n is 1 to 10; and wherein the first redox couple and the second redox couple include the same organic compound having formula I.

2. The flow battery of claim 1 wherein $R_3$ is —$SO_3H$, —$CF_3$, or —$NO_2$.

3. The flow battery of claim 1 wherein $R_3$ is —$SO_3H$, —$SO_3Na$, —$SO_3K$, —$CO_2H$, —OH, —I, —Cl, —Br, —F, —$CF_3$, —$NO_2$, —$CCl_3$, —CN, —$PO_3H_2$, —$PO_3^{2-}M^+_2$, —COOH, —$COO^-M^+$, —COOR, —CHO, —$O^-M^+$ or —COR where R is H or $C_{1-10}$ alkyl and $M^+$ is $Na^+$ or $K^+$.

4. The flow battery of claim 1 wherein $R_1$ and $R_2$ are each independently $C_{1-10}$ alkyl, —$NH_2$, —$O^-M^+$, —NHR, —$N(R)_2$, —NHCOR, —OR or phenyl.

5. The flow battery of claim 1 wherein $R_1$ $R_2$, and $R_3$ are each independently —$SO_3H$, —$CO_2H$, —OH, —$PO_3H_2$, —$PO_3^{2-}M+_2$, —COOH, —$COO^-M^+$, —$O^-M^+$ pyridinyl, imidazoyl, or pyrroyl.

6. The flow battery of claim 1 further comprising an ion exchange membrane interposed between the positive electrode and the negative electrode.

7. The flow battery of claim 6 wherein the ion exchange membrane has an equivalent weight greater between 1000 and 2000 with respect to sulfonic acid groups.

8. The flow battery of claim 1 wherein $R_1$ and $R_2$ are each independently —$SO_3H$, —$SO_3Na$, —$SO_3K$, —$CO_2H$, —OH, —$OCH_3$, $C_{1-10}$ alkyl, —$(CH_2CH_2O)_nOCH_3$, —$NH_2$, $N(CH_3)_2$, —I, —Cl, —Br, —F, —$CF_3$, —$CF_2H$, —$NO_2$, —$CCl_3$, —CN, —$PO_3H_2$, —$PO_3^{2-}M^+_2$, —$COO^-M^+$, —COOR, —CHO, —$O^-M^+$, —$NHCOR_2$, —OR, phenyl, or —COR.

9. The flow battery of claim 8 wherein $R_3$ is —$SO_3H$, —$SO_3Na$, —$SO_3K$, —$CO_2H$, —OH, —$OCH_3$, $C_{1-10}$ alkyl, —$(CH_2CH_2O)_nOCH_3$, —$NH_2$, —$N(CH_3)_2$, —I, —Cl, —Br, —F, —$CF_3$, —$CF_2H$, —$NO_2$, —$CCl_3$, —CN, —$PO_3H_2$, —$PO_3^{2-}M^+_2$, —$COO^-M^+$, —COOR, —CHO, —$O^-M^+$, or —COR.

10. The flow battery of claim 1 wherein $R_1$, $R_2$ and $R_3$ are each independently —$SO_3H$, —$SO_3Na$, —$SO_3K$, —$CO_2H$, —OH, —$OCH_3$, $C_{1-10}$ alkyl, —$(CH_2CH_2O)_nOCH_3$, —$NH_2$, $N(CH_3)_2$, —I, —Cl, —Br, —F, —$CF_3$, —$CF_2H$, —$NO_2$, —$CCl_3$, —CN, —$PO_3H_2$, —$PO_3^{2-}M^+_2$, —$COO^-M^+$, —COOR, —CHO, —$O^-M^+$, —OR, phenyl, or —COR.

11. The flow battery of claim 1 wherein $R_1$, $R_2$ and $R_3$ are each independently —$SO_3H$, —$SO_3Na$, —$SO_3K$, —$CO_2H$, —OH, —$OCH_3$, $C_{1-10}$ alkyl, —$(CH_2CH_2O)_nOCH_3$, —$CF_3$, —$CF_2H$, —$NO_2$, —$CCl_3$, —CN, —$PO_3H_2$, —$PO_3^{2-}M^+_2$, —$COO^-M^+$, —COOR, —CHO, —$O^-M^+$, —OR, phenyl, or —COR.

12. The flow battery of claim 11 wherein $R_3$ is —$SO_3H$, —$CF_3$, or —$NO_2$.

13. The flow battery of claim 12 further comprising an ion exchange membrane interposed between the positive electrode and the negative electrode.

14. The flow battery of claim 13 wherein the ion exchange membrane has an equivalent weight greater between 1000 and 2000 with respect to sulfonic acid groups.

* * * * *